United States Patent
Zeng et al.

(10) Patent No.: US 7,820,334 B2
(45) Date of Patent: Oct. 26, 2010

(54) FUEL CELL AND OXIDANT DISTRIBUTION PLATE FOR FUEL CELL

(75) Inventors: Yixin Zeng, Kariya (JP); Katsuhiro Kajio, Anjo (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 1226 days.

(21) Appl. No.: 10/547,339

(22) PCT Filed: Mar. 1, 2004

(86) PCT No.: PCT/JP2004/002506

§ 371 (c)(1),
(2), (4) Date: Apr. 18, 2006

(87) PCT Pub. No.: WO2004/079843

PCT Pub. Date: Sep. 16, 2004

(65) Prior Publication Data

US 2006/0210862 A1    Sep. 21, 2006

(30) Foreign Application Priority Data

Mar. 5, 2003 (JP) ............................. 2003-058975

(51) Int. Cl.
*H01M 2/40* (2006.01)
(52) U.S. Cl. .................. 429/457; 429/415; 429/456; 429/458
(58) Field of Classification Search ............ 429/17, 429/26, 34, 39, 415, 465, 457, 458, 461, 429/512
See application file for complete search history.

(56) References Cited

U.S. PATENT DOCUMENTS

| | | | |
|---|---|---|---|
| 5,631,099 A | 5/1997 | Hockaday | |
| 5,700,595 A | 12/1997 | Reiser | |
| 5,773,160 A | 6/1998 | Wilkinson et al. | |
| 5,853,909 A | 12/1998 | Reiser | |
| 5,858,569 A | 1/1999 | Meacher et al. | |
| 5,902,692 A | 5/1999 | Batawi | |
| 6,066,409 A | 5/2000 | Ronne et al. | |
| 2003/0039875 A1 | 2/2003 | Horiguchi et al. | |
| 2004/0110049 A1* | 6/2004 | Shimotori et al. | ............. 429/25 |

FOREIGN PATENT DOCUMENTS

EP     1 286 404    2/2003

(Continued)

*Primary Examiner*—Patrick Ryan
*Assistant Examiner*—Ben Lewis
(74) *Attorney, Agent, or Firm*—Oblon, Spivak, McClelland, Maier & Neustadt, L.L.P.

(57) ABSTRACT

To provide a fuel cell and an oxidant distributing plate for the fuel cell. A water created in the fuel cell is used to humidify an oxidant gas and/or a fuel flowing in an opposite passage opposite to a MEA. The fuel cell includes a MEA 1, an oxidant distributing plate 3 disposed facing to an oxidant pole for supplying an oxidant gas thereto, and a fuel distributing plate 4 disposed facing to an fuel pole for supplying the fuel thereto. At least one of the oxidant distributing plate 3 and the fuel distributing plate 4 is provided with an opposite passage 31, 41 formed on an opposite surface opposite to the MEA, and a reaction passage 32, 42 formed on a facing surface facing to the MEA, and communicated with the opposite passage 31, 41.

10 Claims, 12 Drawing Sheets

FOREIGN PATENT DOCUMENTS

| | | |
|---|---|---|
| JP | 6-68896 | 3/1994 |
| JP | 06-267560 | 9/1994 |
| JP | 06-267565 | 9/1994 |
| JP | 06-338338 | 12/1994 |
| JP | 07-065845 | 3/1995 |
| JP | 2922132 | 4/1999 |
| JP | 11-508726 | 7/1999 |
| JP | 2000-208156 | 7/2000 |
| JP | 2004-039357 * | 2/2004 |
| JP | 2004-103452 | 4/2004 |
| WO | WO 2004/006368 A2 | 1/2004 |
| WO | WO 2004/025764 A1 | 3/2004 |

* cited by examiner

FUEL CELL AND OXIDANT DISTRIBUTION PLATE FOR FUEL CELL

TECHNICAL FIELD

The present invention relates to a fuel cell having distributing plates, and an oxidant distributing plate for the fuel cell.

BACKGROUND ART

In recent years, a fuel cell has been attended because of an environment protecting aspect and an energy saving aspect thereof. Generally, the fuel cell has a membrane-electrode assembly (hereinafter, sometimes called "MEA"), and generates power by reaction of an oxygen agent (oxidant) and a fuel. The MEA includes an electrolyte membrane of an ion-conducting property, a fuel pole disposed at one side of the electrolyte membrane, and an oxidant pole disposed at other side of the electrolyte membrane, in a thickness direction thereof. Further, the fuel cell has a fuel distributing plate which forms a passage for supplying a fuel to the fuel pole, and an oxidant distributing plate which forms a passage for supplying the oxidant gas to the oxidant pole. Generally, the fuel distributing plate and the oxidant distributing plate are made of a dense material, not of a porous material, so that the gas may not leak.

In the above fuel cell, an excessive drying of the electrolyte membrane having an ion-conducting property deteriorates the ion conduct property thereof. For this reason, the electrolyte membrane should be prevented from the excessive drying. In view of this, in the conventional fuel cell, the oxidant gas or the fuel has been positively humidified before it is supplied to the fuel cell, by an external humidify apparatus such as a bubbler.

Also, in recent years, a solid high polymer type fuel cell in which the fuel distributing plate and the oxidant distributing plate are made of a porous material having multiple pores, has been developed. In this type fuel cell, a water as a liquid phase is penetrated into the respective pores of the oxidant distributing plate and the fuel distributing plate, and then is supplied to the MEA. The penetrated water in the oxidant distributing plate and that in the fuel distributing plate seal the pores of the distributing plates to prevent gas leakage through the pores.

The Patent Publication No. 1 discloses a fuel cell which includes porous distributing plates each having pores. In this fuel cell, both of the oxidant distributing plate and the fuel distributing plate are made of the porous material, and respective rear surfaces of both distributing plates is provided with a water passage. According to this fuel cell, the water in the respective water passages of the porous oxidant distributing plate and the porous fuel distributing plate can be supplied to the MEA through the pores of the both distributing plates. As a result, excessive drying of the electrolyte membrane can be restrained.

The Patent Publication No. 2 discloses a solid high polymer type fuel cell which includes a conductive and hydrophilic fuel distributing plate, and a conductive and hydrophobic humid water transmitting body. The fuel distributing plate is made of a conductive porous material having a hydrophilic property. The humid water transmitting body is disposed on a rear surface of the fuel distributing plate opposite to the MEA, and is made of a conductive porous material having a hydrophobic property.

According to this solid high polymer type fuel cell, the water as the liquid phase retained in the humid water transmitting body is transmitted toward the MEA through the pores of the fuel distributing plate made of the conductive porous material. Thus, excessive drying of the electrolyte membrane can be restrained by the water. Here, since the fuel distributing plate has the hydrophilic property, the water as the liquid phase effectively transmits through the pores to seal them.

Both of the Patent Publication No. 3 and the Patent Publication No. 4 disclose solid high polymer type fuel cells each of which includes a porous construction of an air distributing plate and a fuel distributing plate. In these fuel cells, a water created in an air pole is allowed to pass through the air distributing plate in a thickness direction thereof, and is supplied to a water passage formed on a rear surface of the air distributing plate. Pressure of a fuel gas in a fuel passage of the fuel distributing plate is adjusted for allowing the water in the water passage to pass through the fuel distributing plate in the thickness direction thereof to the fuel passage. Thus, the fuel in the fuel passage is humidified.

Patent Publication No. 1 Japanese Patent Publication No. 6-338338
Patent Publication No. 2 Japanese Patent No. 2922132 (Japanese Patent Publication No. 8-250130
Patent Publication No. 3 U.S. Pat. No. 5,853,909
Patent Publication No. 4 U.S. Pat. No. 5,700,595

DISCLOSURE OF THE INVENTION

In the above fuel cells, the oxidant distributing plate does not allow the oxidant gas to flow in both of an opposite passage opposite to the MEA, and a reaction passage facing to the MEA and having a front-rear relation to the opposite passage. Similarly, the fuel distributing plate does not allow the fuel gas to flow in both of an opposite passage opposite to the MEA, and a reaction passage facing to the MEA and having a front-rear relation to the opposite passage.

The present invention has been made by taking the above circumstances into consideration, and provides a fuel cell and an oxidant distributing plate in which an active material in the distributing plate flows from the opposite passage to the reaction passage having the front-rear relation to the opposite passage.

A fuel cell of the present invention comprises (i) a membrane-electrode assembly including an electrolyte membrane having an ion-conducting property, an oxidant pole disposed at one side of the electrolyte membrane in a thickness direction thereof, and a fuel pole disposed at other side of the electrolyte membrane in the thickness direction thereof, (ii) an oxidant distributing plate disposed facing to the oxidant pole for supplying an oxidant gas to the oxidant pole, and (iii) a fuel distributing plate disposed facing to the fuel pole for supplying a fuel to the fuel pole.

The fuel cell is characterized by that at least one of the oxidant distributing plate and the fuel distributing plate is provided with (a) an opposite passage formed on an opposite surface which is opposite to the membrane-electrode assembly, and (b) a reaction passage which is formed on a facing surface which faces to the membrane-electrode assembly, which is communicated with the opposite passage, and which allows an oxidant gas or a fuel having flowed in the opposite passage to flow in the reaction passage.

An oxidant distributing plate for a fuel cell of the present invention is disposed facing to an oxidant pole of a membrane-electrode assembly of a fuel cell for supplying an oxidant gas to the oxidant pole. The oxidant distributing plate is characterized by (a) an opposite passage which is formed on an opposite surface which is opposite to the membrane-electrode assembly and in which the oxidant gas flows, and (b) a reaction passage which is formed on a facing surface which faces to the membrane-electrode assembly, which is communicated with the opposite passage, and which allows the oxidant gas having flowed in the opposite gas to flow in the reaction passage.

At least one of the oxidant distributing plate and the fuel distributing plate of the fuel cell of the present invention, and the oxidant distributing plate of the present invention, include (a) an opposite passage formed on an opposite surface which is opposite to the membrane-electrode assembly, and (b) a reaction passage which is formed on a facing surface which faces to the membrane-electrode assembly, which is communicated with the opposite passage, and which allows an oxidant gas or a fuel having flowed in the opposite passage to flow in the reaction passage.

Here, the opposite passage is formed on one surface, and the reaction passage is formed on other surface having a front-rear relation to the opposite passage, of the distributing plate, respectively. The oxidant gas or the fuel, after having flowed in the opposite passage of the distributing plate, flows in the reaction passage thereof. The present invention can provide the fuel cell and the oxidant distributing plate which have such front-rear relation passage system.

According to the present invention, the oxidant gas and/or the fuel before a reaction are/is humidified in the opposite passage of the distributing plate formed on the opposite surface opposite to the MEA, by utilizing the water generated in the fuel cell. Thus, "internal self humidifying construction" can be realized. In this way, the humidifying apparatus for humidifying the oxidant gas and/or the fuel before supplied to the fuel cell, can be simplified or excluded.

Especially, when the oxidant distributing plate is porous, the water created in the oxidant pole during the power generation can be effectively used. That is, a water component or a moisture, based on the created water in the oxidant pole, passes through the oxidant distributing plate from the reaction passage to the opposite passage in the thickness direction thereof, which can humidify the oxidant gas flowing in the opposite passage of the oxidant distributing plate before the reaction, in the fuel cell.

Similarly, when the fuel distributing plate is porous, the water created during the power generation can be effectively used. That is, a water component or a moisture based on the created water passes through the fuel distributing plate in the thickness direction thereof, which can humidify the fuel gas flowing in the opposite passage of the fuel distributing plate before the reaction, in the fuel cell.

According to the present invention, when temperature of the oxidant gas or the fuel supplied to the fuel cell is low, the oxidant gas or the fuel can be pre-heated when it is flowing in the opposite passage in the fuel cell. To the contrary, when temperature of the oxidant gas or the fuel supplied to the fuel cell is high, the oxidant gas or the fuel can be pre-cooled when it is flowing in the opposite passage in the fuel cell.

BRIEF EXPLANATION OF THE DRAWINGS

FIGS. 13(A) to 13(C) show a mode 1 of the oxidant distributing plate, in which FIG. 13(A) is a plan view of the oxidant distributing plate, FIG. 13(B) is a cross-sectional view of the oxidant distributing plate, and FIG. 13(C) is a rear view of the oxidant distributing plate, respectively;

FIGS. 14(A) to 14(C) show a mode 2 of the oxidant distributing plate, in which FIG. 14(A) is a plan view of the oxidant distributing plate, FIG. 14(B) is a cross-sectional view of the oxidant distributing plate, and FIG. 14(C) is a rear view of the oxidant distributing plate, respectively; and FIGS. 15(A) to 15(C) show a mode 3 of the oxidant distributing plate, in which FIG. 15(A) is a plan view of the oxygen agent distributing plate, FIG. 15(B) is a cross-sectional view of the oxidant distributing plate, and FIG. 15(C) is a rear view of the oxidant distributing plate, respectively.

BEST MODE FOR CARRYING OUT THE INVENTION

Figure 1:
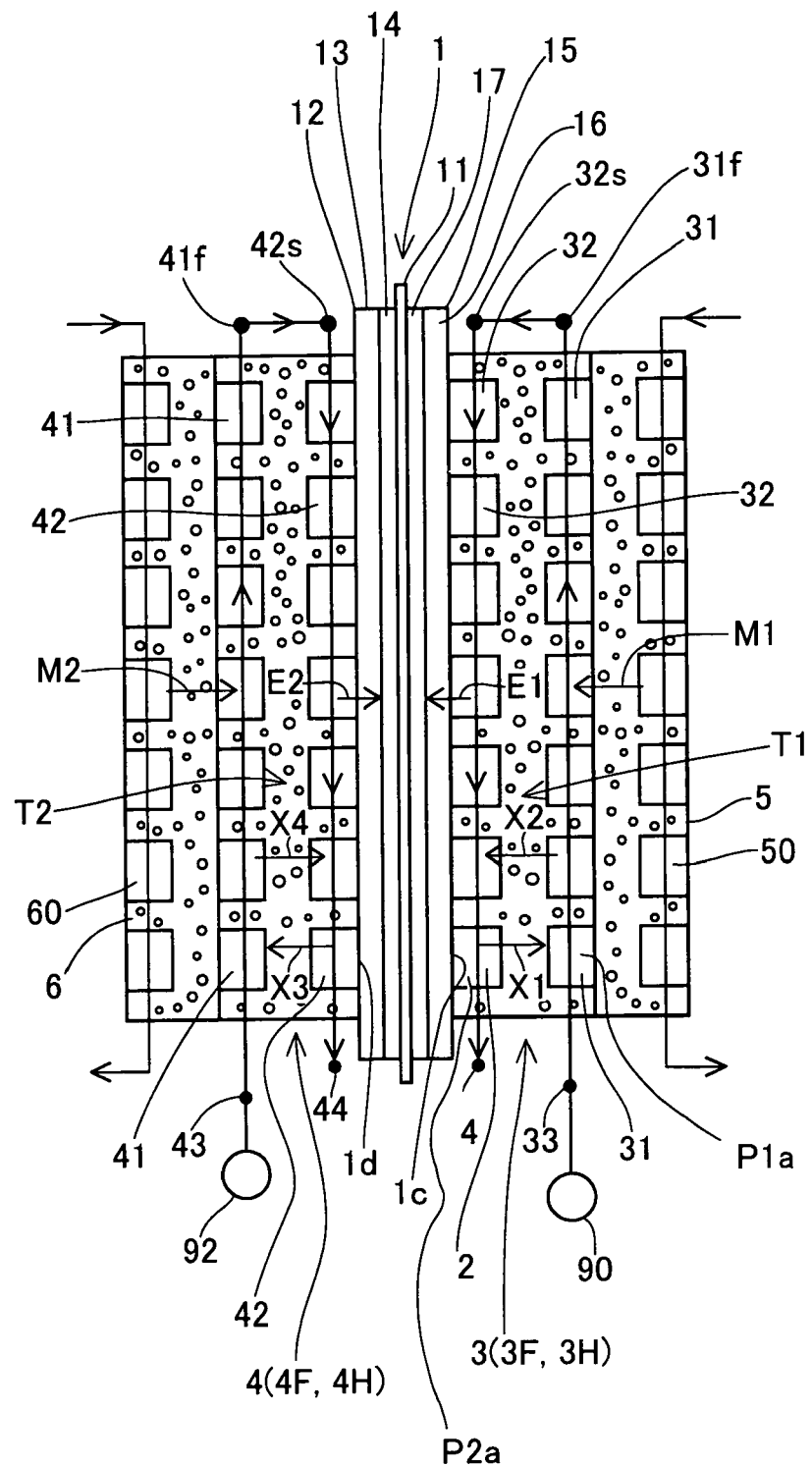
FIG. 1 relates to the first embodiment and is a cross-sectional view showing a concept of the fuel cell schematically.

In the present invention, at least one of the oxidant distributing plate and fuel plate has: an opposite passage formed on an opposite surface thereof which is opposite to the membrane electrode assembly; and a reaction passage which is formed on a facing surface thereof which faces to the membrane electrode assembly, which is communicated with the opposite passage, and which allows an oxidant gas or a fuel having flowed in the opposite passage to flow in the reaction passage.

Here, "opposite face" means the one face of the distributing plate or the fuel distributing plate opposite to the MEA, while "facing face" means the other face of the distributing plate or the fuel distributing plate facing to the MEA. The opposite passage and the reaction passage have the front-rear relation with respect to the distributing plate and are communicated with each other. The oxidant gas or the fuel gas, after having flowed in the opposite passage, flows in the reaction passage, to be utilized for power generation.

The oxidant distributing plate can be a mode in which (a) an opposite passage formed on an opposite surface opposite to the MEA and connected with a passage inlet of the oxidant gas, and (b) a reaction passage formed on a facing surface facing to the MEA and communicated with the opposite passage for allowing the oxidant gas having flowed in the opposite passage to flow in the reaction passage, are provided. As the oxidant gas, an oxygen containing gas such as an air can be given.

The fuel distributing plate can be a mode in which (a) an opposite passage formed on an opposite surface opposite to the MEA and connected with a passage inlet of the fuel, and (b) a reaction passage formed on a facing surface facing to the MEA and communicated with the opposite passage for allowing the fuel having flowed in the opposite passage to flow in the reaction passage, are provided. As the fuel, a hydrogen containing gas such as a hydrogen gas can be given.

In the present invention, a humidifying element for humidifying the oxidant gas or the fuel flowing in the opposite passage in the fuel cell can be provided. The oxidant gas or the fuel flowing in the opposite passage of at least one of the oxidant distributing plate and the fuel distributing plate can be humidified in the fuel cell by the humidifying element. Thus, the water component of the oxidant gas or the fuel for the power generating reaction at a reaction surface can be secured. As a result, the electrolyte is prevented from the excessive drying to have preferable ion-conducting property. Thus, the excellent power generating quality of the fuel cell can be secured.

The above humidifying element humidifies the oxidant gas or the fuel within the fuel cell. The humidifying element for the oxidant distributing plate can be constructed by making at least part of the oxidant distributing plate porous, for example. The part can be a downstream area of the reaction passage of the oxidant distributing plate. Whole of the oxidant distributing plate can be made porous, or an upstream area of the reaction passage of the oxidant distributing plate can be densified except a downstream area, to construct the humidifying element.

In the present invention, the humidifying element for the fuel distributing plate can be constructed by making at least part of the fuel distributing plate porous, for example. The part of the fuel distributing plate can be a downstream area of the reaction passage. Whole of the fuel distributing plate can be made porous, or an upstream area of the reaction passage of the fuel distributing plate can be densified except a downstream area, to construct the humidifying element.

The water created in the fuel cell during the power generation reaction can be effectively used. The water component or the moisture based on the created water in the oxidant pole during the power generation reaction passes through or transmits the oxidant distributing plate and/or the fuel distributing plate. Thus, the oxidant gas and/or the fuel before the reaction, not having been supplied to the reaction surface of the MEA, can be humidified in the fuel cell. Such humidifying system can be called "internal self humidifying construction".

Next, a pore rate of the distributing plates will be explained. In the oxidant distributing plate, the pore rate in the downstream area can be selected relatively larger than that in the upstream area, of the reaction passage. Allowing the water component stayed in the downstream area of the reaction passage to pass through the oxidant distributing plate in the thickness direction thereof, can conveniently humidify the oxidant gas in the opposite passage. An active material in the oxidant gas in the opposite passage, having passed through the oxidant distributing plate in the thickness direction, can be conveniently supplied into the downstream area of the reaction passage.

Here, downstream area of the reaction passage means a relatively downstream portion, and generally corresponds to a downstream half of the reaction passage. The upstream area of the reaction passage means a relatively upstream portion, and generally corresponds to an upstream half of the reaction passage.

In the fuel distributing plate, the pore rate in the downstream area can be selected relatively larger than that in the upstream area, of the reaction passage. Allowing the water component stayed in the downstream area of the reaction passage to pass through the fuel distributing plate in the thickness direction thereof, can conveniently humidify the fuel in the opposite passage. An active material in the fuel in the opposite passage having passed through the fuel distributing plate in the thickness direction, can be conveniently supplied into the downstream area of the reaction passage.

In the present invention, a refrigerant distributing plate for the oxidant distributing plate is disposed on a side of the oxidant distributing plate opposite to the MEA, for supplying the refrigerant to the oxidant distributing plate. In this case, at least a part of the refrigerant distributing plate can be made porous to construct the humidifying element. Whole of the refrigerant distributing plate can be made porous to construct the humidifying element. As the refrigerant, a cooling water or a cooling gas can be given.

In the present invention, as mentioned above, the oxidant distributing plate has pores. As a pore diameter which is suitably selected, 0.1 to 200 μm, 0.1 to 100 μm can be selected, for example. 0.1 to 30 μm, 2 to 15 μm can be selected, or 3 to 4 μm can be selected. As the pore rate of the oxidant distributing plate which is suitably selected, 10 to 90 volume % can be selected. 15 to 60 volume % can be selected, or 20 to 40 volume % can be selected. However, the pore diameter and the pore rate are not limited to these ranges.

Also, the fuel distributing plate has pores. As a pore diameter which is suitably selected, 0.1 to 200 μm, 0.1 to 100 μm, 0.1 to 100 μm can be selected. 0.1 to 30 μm, 2 to 15 μm can be selected, or 3 to 4 μm can be selected. As the pore rate of the fuel distributing plate which is suitably selected, 10 to 90 volume % can be selected. 15 to 60 volume % can be selected, or 20 to 40 volume % can be selected. However, the pore diameter and the pore rate are not limited to these ranges.

In the present invention, the oxidant distributing plate and/or the fuel distributing plate each having the pores as mentioned above, can have a hydrophilic property or a hydrophobic property. When they are hydrophilic, on a facing surface facing to the MEA, the pore diameter of the downstream area is selected relatively small, and the pore diameter of the upstream area is selected relatively large, in the oxidant gas flowing direction, thereby using a capillarity. The pore diameter can be varied stepwise or continuously.

When the oxidant distributing plate and/or the fuel distributing plate are/is hydrophobic, at a facing surface facing to the MEA, the pore diameter of the downstream area is selected relatively large, and the pore diameter of the upstream area is selected relatively small in the oxidant gas flowing direction, thereby adjusting a vapor pressure. The pore diameter can be varied stepwise or continuously.

The pore diameter of the oxidant distributing plate can have one of following three forms. In the first form, the pore diameter of the reaction passage is constant from the downstream area to the upstream area. In the second form, the pore diameter of the reaction passage at the downstream area is selected relatively smaller than that at the upstream area. In the third form, the pore diameter of the reaction passage at the downstream area is selected relatively larger than that at the upstream area.

The pore diameter of the fuel distributing plate can have one of following three forms. In the first form, the pore diameter of the reaction passage is constant from the downstream area to the upstream area. In the second form, the pore diameter of the reaction passage at the downstream area is selected relatively smaller than that at the upstream area. In the third form, the pore diameter of the reaction passage at the downstream area is selected relatively larger than that at the upstream area.

The fuel cell of the present invention can be mounted on a vehicle, can be set in the predetermined position, or can be portable. The fuel cell can be used personally or in business.

PREFERRED EMBODIMENT

In the following, various embodiments embodying the present invention will be explained.

First Embodiment

A first embodiment of the present invention will be explained with reference to a FIG. 1. The FIG. 1 shows a concept of a solid high polymer type fuel cell, and is a cross-sectional view taken along in the thickness direction of an electrolyte membrane 11.

As shown in FIG. 1, a membrane electrolyte assembly (MEA) 1 of the fuel cell includes an electrolyte membrane 11, a fuel pole 12 and an oxidant pole 15. The electrolyte membrane 11 is made of a high polymer material having a proton transmission property. The fuel pole 12, sometimes called "anode", is provided at one side of the electrolyte membrane 11 in the thickness direction thereof, and performs an oxidizing reaction. The oxidant pole 15, sometimes called "air pole" or "cathode", is provided at other side of the electrolyte membrane 11 in the thickness direction thereof, and performs a reducing reaction.

In addition, a solid high polymer type fuel cell includes a fuel distributing plate 4 and an oxidant distributing plate 3. The fuel distributing plate 4 is disposed outside the fuel pole 12 of the MEA 1 facing thereto, and allows a gaseous fuel (generally a hydrogen containing gas such as a hydrogen gas etc.) to flow to the fuel pole 12. The oxidant distributing plate 3 is disposed outside the oxidant pole 15 facing thereto, and allows an oxidant gas (generally an oxygen containing gas such as an air etc.) to flow to the oxidant pole 15.

Plural numbers of cell constructions shown in FIG. 1 are stacked in the thickness direction, to form the solid high polymer type fuel cell. The MEA 1, the fuel distributing plate 4 and the oxidant distributing plate 3, etc. are disposed in the vertical (up-down) direction in FIG. 1, but they can be disposed in the lateral (left-right) direction.

In FIG. 1, the oxidant pole 15 of the MEA 1 has a first gas diffusing layer 16 and a first catalyst layer 17. The first gas diffusing layer 16 of a carbon system faces to the oxidant distributing plate 3, and has a porous and conductive properties. The first catalyst layer 17 containing a catalyst substance as a main component faces to the electrolyte membrane 11, and has a porous and conductive properties.

The fuel pole 12 has a second gas diffusing layer 13 and a second catalyst layer 14. The second gas diffusing layer 13 of a carbon system faces to the fuel distributing plate 4, and has a porous and conductive properties. The second catalyst layer 14 containing a catalyst substance as a main component faces to the electrolyte membrane 11, and has a porous and conductive properties. As the catalyst substance, at least one of a platinum, palladium, ruthenium, gold and silver can be illustrated.

The oxidant distributing plate 3 may be called an oxidant/oxidant-distributing plate, or air/air-distributing plate. The oxidant distributing plate 3 is made of a porous material having pores which can become communication pores to give a transmission property in the thickness direction thereof. The oxidant distributing plate 3 has the porous and conductive properties. Generally, the oxidant distributing plate 3 includes a metallic base member made of a carbon system material or a metallic material having an anti-corrosion property.

As shown in FIG. 1, the oxidant distributing plate 3 has a first opposite passage 31 and a first reaction passage 32. The first opposite passage 31 is formed at an opposite surface of the oxidant distributing plate 3 which is opposite to a reaction surface 1c of a cathode side of the MEA 1. The first reaction passage 32 is formed at a facing surface which directly faces to a reaction surface 1c of the cathode side. The first opposite passage 31 is communicated with a first passage inlet 33 forming an inlet of the oxidant gas, and faces to a first refrigerant passage 50. The first reaction passage 32 is communicated with a first passage outlet 34 which forms an outlet of the oxidant gas.

On account of communication of an end portion 31f of the first opposite passage 31 with a start portion 32s of a first reaction passage 32, the oxidant gas having flowed in the first opposite passage 31 flows into the first reaction passage 32 via the end portion 31f and the start portion 32s.

In the first embodiment, as shown in FIG. 1, for humidifying the oxidant gas flowing in the first opposite passage 31 of the oxidant distributing plate 3 in the fuel cell, a first humidifying element T1 is provided. The first humidifying element T1 is constructed by making a wall portion of the oxidant distributing plate 3 facing to the reaction surface 1c of the MEA 1 porous. For this purpose, multiple pores having the transmitting property are formed in the oxidant distributing plate 3, to give the oxidant distributing plate 3 a water transmitting property and a gas transmitting property, respectively shown by an arrow X1 and an arrow X2. A pore diameter and a pore rate of the oxidant distributing plate 3 can be suitably selected. For example, 0.1 to 10 μm as the pore diameter, and 5 to 40 volume % as the pore rate, can be selected respectively. However, noted that the pore diameter and the pore rate are not limited to these ranges.

The fuel distributing plate 4, sometimes called a fuel/fuel-distribution plate, comprises a base member made of a conductive material, such as a carbon system material or a metallic material having an anti-corrosion property. The fuel distributing plate 4 includes a second opposite passage 41, and a second reaction passage 42. The second opposite passage 41 is formed at an opposite surface of the fuel distribution plate 4 which is opposite to a reaction surface 1d at the anode side of the MEA 1. The second reaction passage 42 is formed at a facing surface which faces to a reaction surface 1d of the MEA 1.

The second opposite passage 41 is communicated with a second passage inlet 43 which forms an inlet of the gaseous fuel, and faces to a second refrigerant passage 60. The second reaction passage 42 has a second passage outlet 44 which forms an outlet of the gaseous fuel. On account of communication of an end portion 41f of the second opposite passage 41 with a start portion 42s of the second reaction passage 42, the fuel having flowed in the second opposite passage 41, flows into the second reaction passage 42 via the end portion 41f and the start portion 42s.

For humidifying the gaseous fuel flowing in the second opposite passage 41 of the fuel distributing plate 4, a second humidifying element T2 is provided. The second humidifying element T2 is constructed by making a wall portion of the fuel distributing plate 4 facing to the reaction surface 1d of the MEA 1 porous. For this purpose, multiple pores having the transmitting property are formed in the fuel distributing plate 4, to give the fuel distributing plate 4 a water transmitting property and a gas transmitting property, respectively shown by an arrow X3 and an arrow X4. A pore diameter and a pore rate of the fuel distributing plate 4 can be suitably selected. For example, 0.1 to 10 μm as the pore diameter, and 5 to 40 volume % as the pore rate, can be selected respectively. However, noted that the pore diameter and the pore rate are not limited to these ranges.

As shown in FIG. 1, at a side of the oxidant distributing plate 3 which is opposite to the oxidant pole 15 of the MEA 1, a first refrigerant distributing plate 5 is disposed. The first refrigerant distributing plate 5 has a first refrigerant passage 50 for allowing a refrigerant (generally water as liquid phase) for cooling the solid high polymer type fuel cell to flow. The first refrigerant passage 50 is formed at a position which is opposite to the first opposite passage 31 of the oxidant distributing plate 3. The first refrigerant distributing plate 5 comprises a base member made of a porous material having multiple pores which gives a transmission property in the thickness direction, and constitutes the first humidifying element T1 together with the porous oxidant distributing plate 3.

At a side of the fuel distributing plate 4 which is opposite to the fuel pole 12 of the MEA 1, a second refrigerant distributing plate 6 is disposed. The second refrigerant distributing plate 6 has a second refrigerant passage 60 for allowing a refrigerant (generally water as liquid phase) for cooling the solid high polymer type fuel cell to flow. The second refrigerant passage 60 is formed at a position which is opposite to the second opposite passage 41 of the fuel distributing plate 4. The second refrigerant distributing plate 6 comprises a base member made of a porous material having multiple pores which give a transmission property in the thickness direction, and constitutes the second humidifying element T2 together with the porous fuel distributing plate 4.

When driving the solid high polymer type fuel cell, a gas supplying source 90 such as a fan, oxygen pump and compressor, etc. disposed outside the fuel cell is driven. The oxidant gas is supplied from the first passage inlet 33 to the first opposite passage 31 of the oxidant distributing plate 3. In detail, the oxidant gas, having flowed to the end portion 31f of the first opposite passage 31 of the oxidant distributing plate 3, flows into the start portion 32s of the first reaction passage 32. The oxidant gas then flows in the first reaction passage 32 and is discharged from the first passage outlet 34. In flowing in the first reaction passage 32, the oxidant gas flows into the first gas diffusing layer 16 and the first catalyst layer 17 of the oxidant pole 15 of the MEA 1, as shown by an arrow E1, to be utilized for the power generating reaction.

Also, a fuel supplying source 92 such as a fan, pump and compressor, etc. is driven, so that the fuel is supplied from the second passage inlet 43 to the second opposite passage 41, of the fuel distributing plate 4. In detail, the gaseous fuel having flowed to the end portion 41f of the second opposite passage 41, flows into the start portion 42s of the second reaction passage 42. The fuel then flows in the second reaction passage 42 and is discharged from the second passage outlet 44 of the fuel distributing plate 4. In flowing the second reaction passage 42, the fuel flows into the second gas diffusing layer 13 and second catalyst layer 14 of the fuel pole 12, as shown by an arrow E2, to be utilized for the power generating reaction.

In the power generating reaction, a catalysis of the second catalyst layer 14 of the fuel pole 12 create protons (hydrogen ions) and electrons (e⁻) from the hydrogen contained in the fuel. The created protons transmit the electrolyte membrane 11 of the MEA 1 in the thickness direction thereof and reach the oxidant pole 15. The electrons flowing through an external conductive route perform electrical works in a load provided in the external conductive route. The electrons then flow to the oxidant pole 15.

At the oxidant pole 15, the oxidant gas (generally air) in the oxidant pole 15, the protons and the electrons react with each other to create the water, by catalysis of the first catalyst layer 17 of the oxidant pole 15. As result of the power generating reaction, the water is created at the oxidant pole 15 of the MEA 1. The created water stays in the first reaction passage 32 of the oxidant distributing plate 3. Especially, the water flows downward together with the oxidant gas and stays at the downstream area of the first reaction passage 32.

According to the first embodiment, the porous oxidant distributing plate 3 can transmit the stayed water. In detail, the water stayed in the first reaction passage 32 is transmitted through the pores of the oxidant distributing plate 3 in the thickness direction thereof (shown by an arrow X1), by the capillarity. Thus, the water is transmitted from the first reaction passage 32 to the first opposite passage 31, to humidify the oxidant gas flowing in the first opposite passage 31 of the oxidant distributing plate 3. As a result, the oxidant gas flowing in the first opposite passage 31 is suitably humidified by the transmitted water when the oxidant gas reaches the start portion 32s of the first reaction passage 32.

The humidified oxidant gas flows in the first reaction passage 32 of the oxidant distributing plate 3 from the start portion 32s, and is consumed for the power generating reaction. Thus, the excessive drying of the electrolyte membrane 11 can be restrained, resulting in that the power generating quality of the fuel cell can be secured properly. According to the first embodiment, the water created in the fuel cell during the power generating reaction is effectively used to humidify the oxidant gas, before the oxidant gas is supplied to the reaction surface 1c at the cathode side of the MEA 1. Thus, the fuel cell can realize the "internal self humidifying construction".

Therefore, according to the first embodiment, the humidifying operation for the oxidant gas to be performed before the oxidant gas is supplied to the first passage inlet 33 of the oxidant distributing plate 3, can be simplified or excluded. Resultantly, the external humidifying apparatus for humidifying the oxidant gas outside the fuel cell before the oxidant gas is supplied to the first passage inlet 33, can be simplified or excluded, similarly.

Especially, the water created during the power generating reaction, is apt to gather at the downstream area of the first reaction passage 32 of the oxidant distributing plate 3 by an influence of the flowing oxidant gas etc. Such gather may cause a flooding phenomenon of the water at the downstream area. When the flooding phenomenon occurs, the water closes the gas passage to restrict the gas supply to the MEA 1.

Making at least the downstream area of the first reaction passage 32 of the oxidant distributing plate 3 porous contributes to transmit the water, which may excessively stay at the downstream area of the flowing oxidant gas. In detail, such water is transmitted through the pores of the oxidant distributing plate 3 in the thickness direction (shown by an arrow X1) to the first opposite passage 31, by the capillarity etc. The downstream area of the first reaction passage 32 where the created water is apt to stay can be dehumidified, so that the flooding phenomenon at the downstream area can be restrained. In this way, variation of the power generating at the downstream area in the oxidant gas flowing direction can be decreased, which secures the power generating quality of the fuel cell properly.

According to the first embodiment, as shown in FIG. 1, the refrigerant distributing plate 5 is constructed porous to have the transmission property in the thickness direction thereof. As a result, the refrigerant (generally, water) flowing in the first refrigerant passage 50 of the refrigerant distributing plate 5 is transmitted in the thickness direction thereof (shown by an arrow M1) toward the oxidant distributing plate 3 by the capillarity ect. Thus, the oxidant gas in the first opposite passage 31 of the oxidant distributing plate 3 facing to the first refrigerant passage 50, can be humidified.

That is, in the first embodiment, the oxidant gas in the first opposite passage 31 of the oxidant distributing plate 3 can be humidified doubly by two kinds of fluids. One fluid is the refrigerant flowing in the first refrigerant passage 50 of the first refrigerant distributing plate 5. Other fluid is the water created during the power generation and stays in the first reaction passage 32 of the oxidant distributing plate 3. In this way, the gas humidifying ability can be heightened.

By adjusting a pressure of the refrigerant (water) flowing in the first refrigerant passage 50, an amount of the water flowing in the direction shown by an arrow M1 from the first refrigerant passage 50 to the first opposite passage 31 of the oxidant distributing plate 3 can be adjusted. Thus, the humidifying amount of the oxidant gas in the first opposite passage 31 by the refrigerant can be adjusted.

By the way, as the oxidant gas flows to the downstream of the first reaction passage 32 of the oxidant distributing plate 3, density of the oxygen which is the active material gradually decreases, sine the oxygen is consumed for the power generating reaction. Such decrease of the oxygen density may cause variation of the power generation. In the first embodiment, the oxidant distributing plate 3 having the gas transmitting property in the thickness direction thereof, can transmit the oxidant gas flowing in the first opposite passage 31.

That is, the fresh oxidant gas (before the reaction) of high oxygen density in the first opposite passage 31, is transmitted through the oxidant distributing plate 3 in the direction (shown by the arrow X2). In this way, the oxygen which is the active material is positively supplied from the first opposite passage 31 to the first reaction passage 32, of the oxidant distributing plate 3.

Generally, a pressure P2 in the first reaction passage 32 which is the downstream side is lower than a pressure P1 (P2<p1) in the first opposite passage 31 which is the upstream side, of the oxidant distributing plate 3, due to a pressure loss occurred during flowing. Thus, diffusion resulted from both of pressure difference of the oxidant between the pressures P1 and P2, and oxygen density difference of the oxidant gas between the first opposite passage 31 and the first reaction passage 32, causes transmission of oxygen in the oxidant gas. That is, oxygen in the fresh oxidant gas (before the reaction) flowing in the first opposite passage 31 is transmitted through the oxidant distributing plate 3 in the thickness direction thereof (shown by the arrow X2), thereby being supplied to the first reaction passage 32.

Especially, a pressure P2a in the most downstream area of the first reaction passage 32 is generally lower than a pressure P1a in the most upstream area of the first opposite passage 31, of the oxidant distributing plate 3, due to the pressure loss. Therefore, transmission of oxygen in the oxidant gas is caused by the diffusion resulted from pressure difference and oxygen density difference. Oxygen in the fresh oxidant gas flowing in the most upstream area of the first opposite passage 31 is transmitted through the oxidant distributing plate 3 in the thickness direction thereof (shown by the arrow X2), and is supplied to the most downstream area (area of lowest oxygen density) of the first reaction passage 32.

In other words, as mentioned above, at the downstream area of the first reaction passage 32 of the oxidant distributing plate 3, density of oxygen as the active material is lowered due to the power generating reaction, which may restrict the power generating reaction. Such restriction can be avoided by the oxidant distributing plate 3 of the first embodiment. That is, in the cross-section of the oxidant distributing plate 3, the downstream area (area of low oxygen density) of the first reaction passage 32 is positioned as close as possible to the upstream area (area of high oxygen density) of the first opposite passage 31.

As a result, the oxidant distributing plate 3 which is porous and which has the gas transmitting property, can transmit the fresh oxidant gas flowing in the upstream area of the first opposite passage 31 in the thickness direction thereof (shown by the arrow X2). The oxidant gas is directly supplied to the downstream area of the first reaction passage 32, which is convenient to restrain variation of the power generation. The power generating quality of the fuel cell can be secured properly in this aspect.

In the fuel pole, the same advantages as that in the oxidant pole can be obtained. That is, the fuel distributing plate 4 being porous has the transmitting property in the thickness direction thereof. As a result, the water in the second reaction passage 42 of the fuel distributing plate 4 is transmitted in the thickness direction (shown by the arrow X3) by the capillarity, thereby being transferred from the second reaction passage 42 to the second opposite passage 41. Thus, the gaseous fuel flowing in the second opposite passage 41 of the fuel distributing plate 4 can be humidified, which can decrease the excessive drying of the electrolyte membrane 11.

Therefore, the humidifying operation to be performed before the fuel is supplied to the second passage inlet 43 can be simplified or excluded. As a result, the external humidifying apparatus for humidifying the fuel outside the fuel cell before the fuel is supplied to the second passage inlet 43, can be simplified or excluded.

According to the first embodiment, the second refrigerant distributing plate 6 is constructed porous and has the transmission property in the thickness direction thereof. The refrigerant (generally, water) flowing in the second refrigerant passage 60 of the second refrigerant distributing plate 6 is transmitted in the thickness direction thereof (shown by an arrow M2) toward the fuel distributing plate 4 by the capillarity. Thus, the fuel in the second opposite passage 41 of the fuel distributing plate 4 can be humidified by the transmitted water.

That is, in the first embodiment, the fuel in the second opposite passage 41 of the fuel distributing plate 4 can be humidified, by both of the refrigerant flowing in the second refrigerant passage 60 of the second refrigerant distributing plate 6, and the water created during the power generation in the second reaction passage 42 of the fuel distributing plate 4.

Adjusting a pressure of the refrigerant flowing in the second refrigerant passage 60, can adjust the humidifying amount of the gaseous fuel flowing in the second opposite passage 41 of the fuel distributing plate 4.

As the gaseous fuel flows to the downstream of the second reaction passage 42 of the fuel distributing plate 4, density of the hydrogen which is the active material gradually decreases, since the hydrogen is consumed for the power generating reaction.

A pressure P4 in the second reaction passage 42 positioned at the downstream side, is lower than a pressure P3 (P4<P3) in the second opposite passage 41 positioned at the upstream side, of the fuel distributing plate 4, due to a pressure loss. Thus, diffusion resulted from pressure difference of the fuel between the pressures P3 and P4, and hydrogen density difference of the fuel between the second opposite passage 41 and the second reaction passage 42, cause transmission of hydrogen in the gaseous fuel. Hydrogen in the gaseous fuel flowing in the second opposite passage 41 is transmitted through the fuel distributing plate 4 in the thickness direction thereof (shown by the arrow X4), thereby being directly supplied to the second reaction passage 42. This is effective to supply the hydrogen as the active material to the second reaction passage 42 of the fuel distributing plate 4.

In the downstream area of the second reaction passage 42 of the fuel distributing plate 4, density of hydrogen as the active material is lowered since the hydrogen is consumed for the power generating reaction. For this reason, the power generating reaction may be restricted. Such restriction can be avoided by the fuel distributing plate 4 of the first embodiment. That is, in the cross-section of the fuel distributing plate 4, the downstream area (area of low hydrogen density) of the second reaction passage 42 is positioned as close as possible to the upstream area (area of high hydrogen density) of the second opposite passage 41.

As a result, the fuel distributing plate 4 which is porous and which has the gas transmitting property can transmit the fresh fuel flowing in the upstream area (area of high hydrogen density) of the second opposite passage 41 in the thickness direction thereof (shown by the arrow X4). The fuel is directly supplied to the downstream area (area of low hydrogen density) of the second reaction passage 42.

Also, the first embodiment is constructed so that a main flowing direction of the refrigerant in the first refrigerant passage 50 is same or is substantially same as a main flowing direction of the oxidant gas in the first reaction passage 32 of the oxidant distributing plate 3. As a result, the downstream area of the flowing refrigerant in the first refrigerant passage 50 corresponds to the downstream area of the first reaction passage 32 of the oxidant distributing plate 3. In the first refrigerant passage 50, temperature of the downstream refrigerant is higher than temperature of the upstream refrigerant, because the flowing refrigerant receives heat.

For this reason, the above construction may make the temperature in downstream area relatively higher than the temperature in upstream area, of the first reaction passage 32 of the oxidant distributing plate 3. Thus, large amount of vapor is holdable in the downstream area of the first reaction passage 32, which is convenient to restrain the flooding of the water in the downstream area.

Apart from the above construction, the main flowing direction of the refrigerant in the first refrigerant passage 50 can be reverse or substantially reverse to the main flowing direction of the oxidant gas in the first reaction passage 32 of oxidant distributing plate 3.

According to the first embodiment, when temperature of the oxidant gas supplied to the fuel cell is low, the oxidant gas flowing in the first opposite passage 31 of the oxidant distributing plate 3 may be pre-heated in the fuel cell. To the contrary, when temperature of the oxidant gas supplied to the fuel cell is high, the oxidant gas flowing in the first opposite passage 31 of the oxidant distributing plate 3 may be pre-cooled in the fuel cell. Thus, temperature of the oxidant gas supplied to the first reaction passage 32 of the oxidant distributing plate 3 can be adjusted properly.

Similarly, when temperature of the fuel gas supplied to the fuel cell is low, the fuel gas flowing in the second opposite passage 41 of the fuel distributing plate 4 may be pre-heated in the fuel cell. To the contrary, when temperature of the fuel gas supplied to the fuel cell is high, the fuel gas flowing in the second opposite passage 41 of the fuel distributing plate 4 may be pre-cooled in the fuel cell. Thus, temperature of the fuel gas supplied to the second reaction passage 42 of the fuel distributing plate 4 can be adjusted properly.

In the above first embodiment, the fuel distributing plate 4, the first refrigerant distributing plate 5, and the second refrigerant distributing plate 6 are made porous. However, they can be made by the dense material. Noted that the oxidant distributing plate 3 should be made by the porous material.

Second Embodiment

Figure 2:
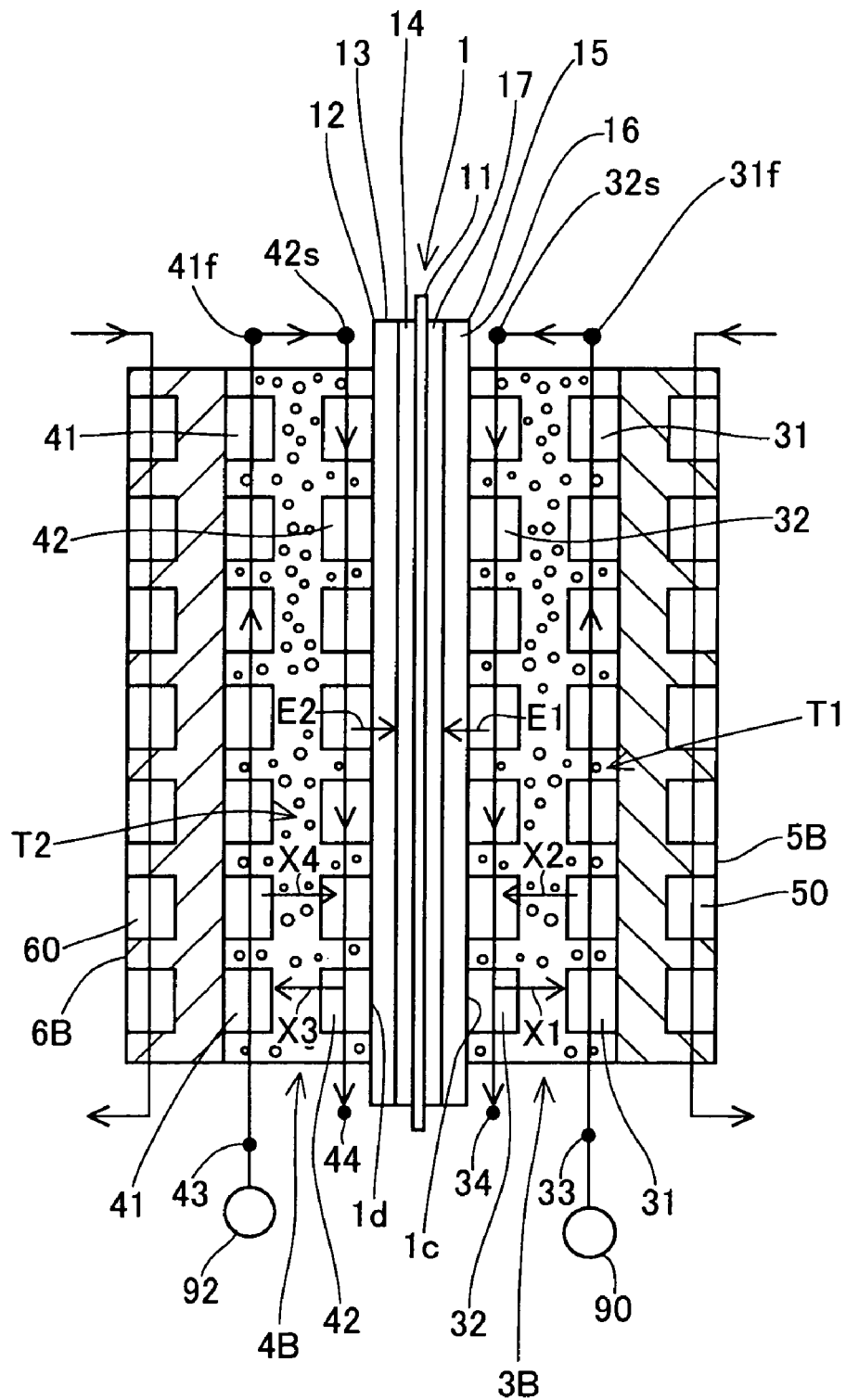
FIG. 2 relates to the second embodiment and is a cross-sectional view showing a concept of the fuel cell schematically.

As second embodiment of the present invention is shown in a FIG. 2. The second embodiment has a construction basically same as that of the first embodiment, and performs the operation and gives the advantage basically same as that of the first embodiment. An oxidant distributing plate 3B has a first opposite passage 31 and a first reaction passage 32. The first opposite passage 31 is formed on an opposite surface of the oxidant distributing plate 3B which is opposite to an reaction surface 1c at side of a cathode of a MEA 1. The first reaction passage 32 is formed on a facing surface which faces to the reaction surface 1c of the MEA 1.

The oxidant distributing plate 3B constructing a first humidifying element T1 is made porous and has a transmitting property in the thickness direction thereof. A water created during a power generating reaction and stayed in the first reaction passage 32 of the oxidant distributing plate 3B is transmitted in the thickness direction thereof (shown by an arrow X1). That is, the water is transmitted by a capillarity etc. of the pores of the oxidant distributing plate 3B, is transferred to the first opposite passage 31, to humidify the oxidant gas flowing in the first opposite passage 31.

As a result, oxidant gas flowing in the first opposite passage 31 is suitably humidified when it reaches a start portion 32s of the first reaction passage 32. Thus, according to the first embodiment so-called "internal self humidifying construction" in which the oxidant gas is humidified by the water created during the power generating reaction can be realized.

In the second embodiment, as shown in FIG. 2, a fuel distributing plate 4B constructing a second humidifying element T2 is made porous to have a transmitting property in the thickness direction thereof. As a result, a water in the second reaction passage 42 of the fuel distributing plate 4B is transmitted in the thickness direction thereof (shown by an arrow X3). The water is transmitted by a capillarity of the pores of the fuel distributing plate 4B, and is transferred to the second opposite passage 41. Thus, the gaseous fuel flowing in the second opposite passage 41 is suitably humidified.

According to the second embodiment, as shown in FIG. 2, both of a first refrigerant distributing plate 5B and a second refrigerant distributing plate 6B are constructed not by a porous material but by a dense material. Therefore, the solid high polymer type fuel cell can be cooled by the refrigerant (generally, water) flowing in the first refrigerant passage 50 of the refrigerant distributing plate 5B, and by the refrigerant (generally, water) flowing in the second refrigerant passage 60 of the refrigerant distributing plate 6B. Noted that the fuel distributing plate 4B constructed by the porous material in the second embodiment, can be constructed by the dense material. However, the oxidant distributing plate 3B should be porous.

Third Embodiment

Figure 3:
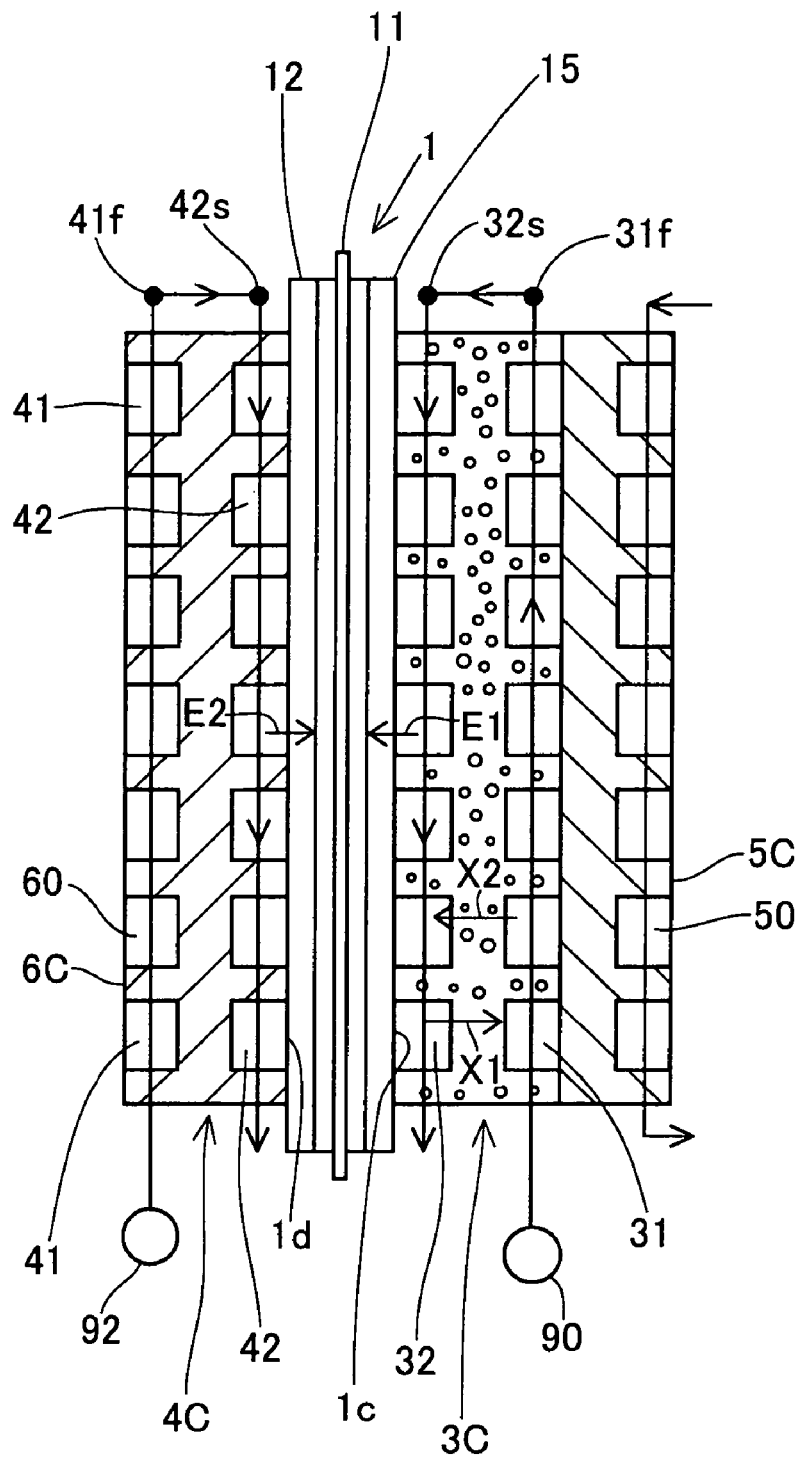
FIG. 3 relates to the third embodiment and is a cross-sectional view showing a concept of the fuel cell schematically.

A third embodiment of the present invention is shown in FIG. 3. The third embodiment has a construction basically same as that of the first embodiment, and performs the operation and gives the advantage basically same as that of the first embodiment.

Also in the third embodiment, an oxidant distributing plate 3C constructing the first humidifying element is made of a porous material, and has a first opposite passage 31 and a first reaction passage 32. The first opposite passage 31 is formed on an opposite surface of the oxidant distributing plate 3C which is opposite to an reaction surface 1c at side of a cathode of a MEA 1. The first reaction passage 32 is formed on a facing surface which faces to the reaction surface 1c of the MEA 1.

As shown in FIG. 3, a fuel distributing plate 4C is made of a dense material, and has a second opposite passage 41 and a second reaction passage 42. The second opposite passage 41 is formed on an opposite surface of the fuel distributing plate 4C opposite to a reaction surface 1d at side of an anode of a MEA 1. The second reaction passage 42 is formed on an opposing surface opposing to the reaction surface 1d of the MEA 1.

According to the third embodiment, so-called "internal self humidifying construction" in which the oxidant gas is humidified by a water created during the power generating reaction can be realized. Noted that all of the fuel distributing plate 4C, the first refrigerant distributing plate 5C and the second refrigerant distributing plate 6C are made by the dense material in the third embodiment, but they can be made porous.

Fourth Embodiment

Figure 4:
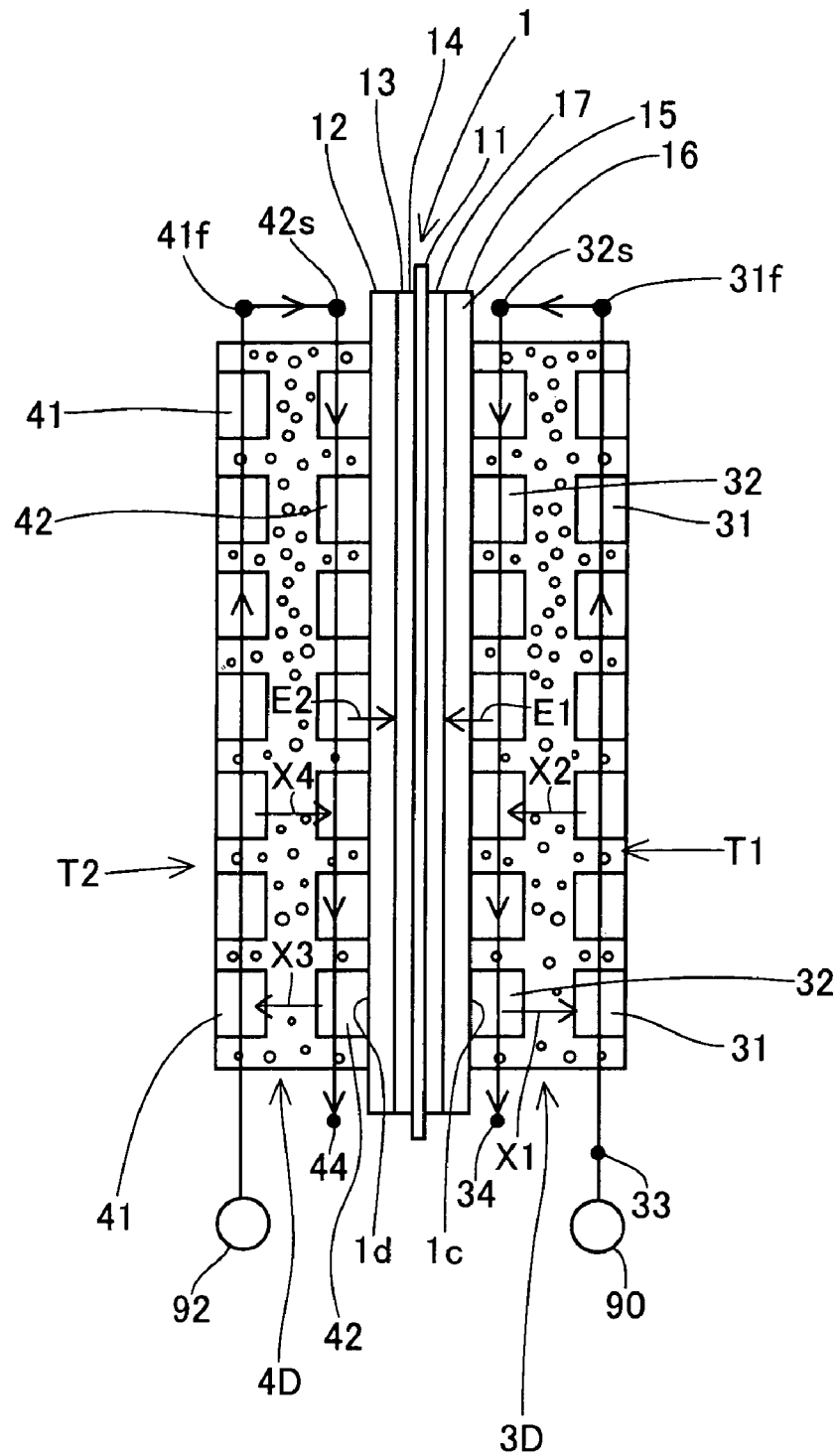
FIG. 4 relates to the four embodiment and is a cross-sectional view showing a concept of the fuel cell schematically.

A fourth embodiment of the present invention is shown in FIG. 4. The fourth embodiment has a construction basically same as that of the first embodiment, and performs the operation and gives the advantage basically same as that of the first embodiment. An oxidant distributing plate 3D constructing the first humidifying element T1 has a first opposite passage 31 and a first reaction passage 32. The first opposite passage 31 is formed on an opposite surface of the oxidant distributing plate 3D which is opposite to an reaction surface 1c at side of a cathode of a MEA 1. The first reaction passage 32 is formed on a facing surface which faces to the reaction surface 1c of the MEA 1.

The oxidant distributing plate 3D is made porous to have a transmission property in a thickness direction thereof. As a result, similar to the above first embodiment, a water created in the first reaction passage 32 of the oxidant distributing plate 3D is transmitted in the thickness direction thereof (shown by an arrow X1). The water is transmitted to the first opposite passage 31 of the oxidant distributing plate 3D by the capillarity etc. Thus, the oxidant gas flowing in the first opposite passage 31 of the oxidant distributing plate 3D can be humidified before the reaction. As a result, excessive drying of the electrolyte membrane 11 can be restrained.

According to the fourth embodiment, so-called "internal self humidifying construction" in which the oxidant gas before the reaction is humidified by the water created in the fuel cell during the power generating reaction can be realized. For this reason, the humidifying operation for humidifying the oxidant gas before it is supplied to a first passage inlet 33 of a solid high polymer type fuel cell, can be simplified or excluded.

Also, in the fourth embodiment, the fuel distributing plate 4D constructing the second humidifying element T2 is made porous to have a transmitting property in the thickness direction thereof. A water stayed in the second reaction passage 42 of the fuel distributing plate 4D is transmitted in the thickness direction (shown by an arrow X3), to be transferred to the second opposite passage 41. The gaseous fuel flowing in the second opposite passage 41 of the fuel distributing plate 4D can be humidified by the transferred water before the reaction.

Noted that as shown in FIG. 4, a first refrigerant distributing plate or a second refrigerant distributing plate is not disposed. Also, the fuel distributing plate 4D which is made of porous material in the fourth embodiment can be made of the dense material.

Fifth Embodiment

Figure 5:
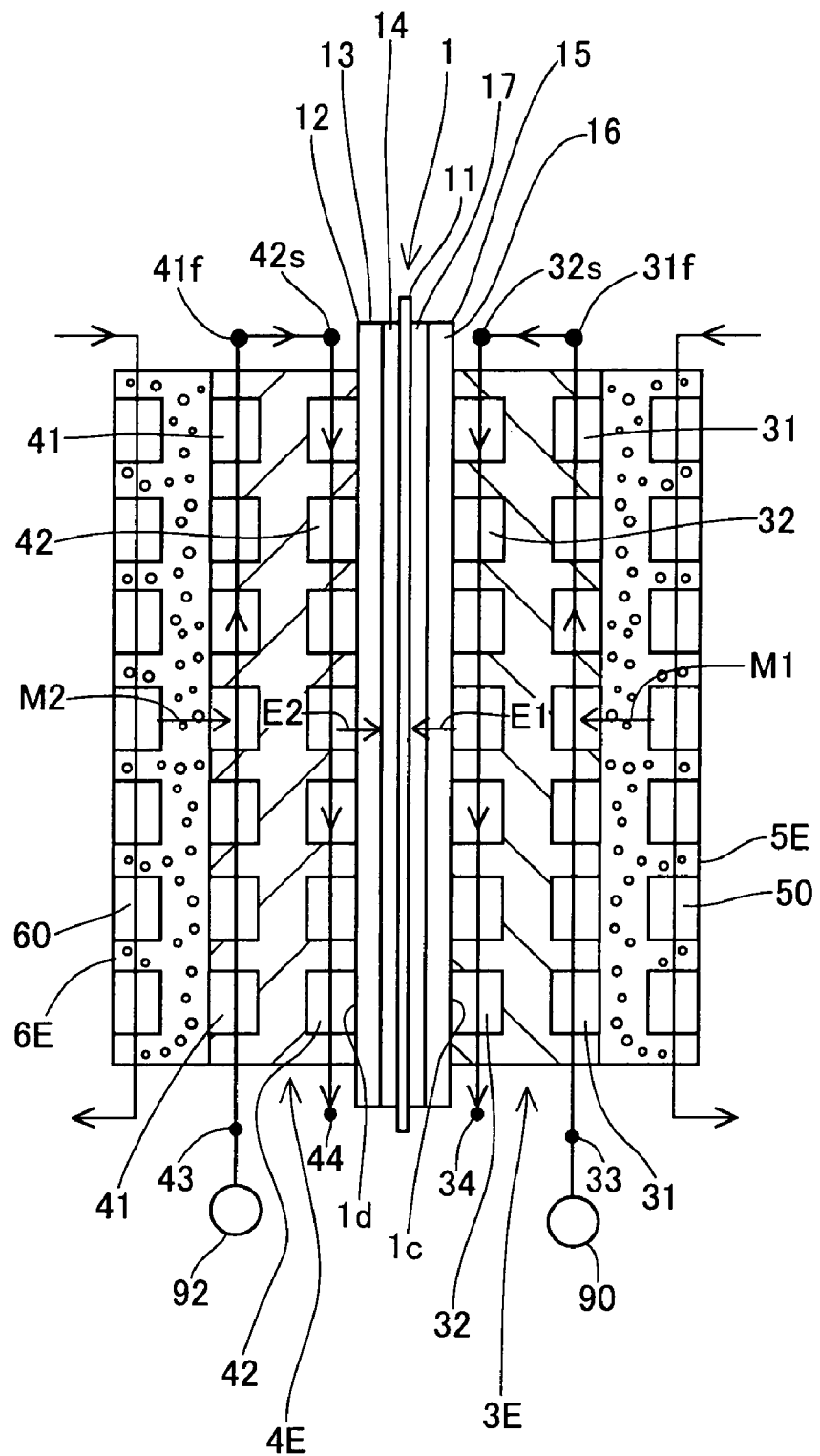
FIG. 5 relates to the fifth embodiment and is a cross-sectional view showing a concept of the fuel cell schematically.

A fifth embodiment of the present invention is shown in FIG. 5. The fifth embodiment has a construction basically same as that of the first embodiment, and performs the operation and gives the advantage basically same as that of the first embodiment. As shown in FIG. 5, an oxidant distributing plate 3E has a first opposite passage 31 and a first reaction passage 32. The first opposite passage 31 is formed on an opposite surface of the oxidant distributing plate 3E which is opposite to an reaction surface 1c of a MEA 1. The first reaction passage 32 is formed on a facing surface which faces to the reaction surface 1c of the MEA 1. Noted that the oxidant distributing plate 3E is made not of a porous material, but of a dense material.

A first refrigerant distributing plate 5E is made porous and has a transmission property in the thickness direction thereof to construct a first humidifying element. As a result, a refrigerant (generally, water) flowing in the first refrigerant passage 50 of the first refrigerant distributing plate 5E is transmitted in a thickness direction thereof (shown by an arrow M1). Thus, the oxidant gas flowing in the first opposite passage 31 of the oxidant distributing plate 3E is humidified by the refrigerant in the cell.

As a result, a humidifying operation and an external humidifying apparatus for humidifying the oxidant gas outside the fuel cell before it is supplied to the first passage inlet 33 can be simplified or excluded. By adjusting pressure of the refrigerant flowing in the first refrigerant passage 50, a transmitting degree of the refrigerant in the first refrigerant passage 50 in the thickness direction (shown by the arrow M1) can be adjusted. Thus, the humidified amount of the oxidant gas by the refrigerant can be adjusted.

A fuel distributing plate 4E has a second opposite passage 41 and a second reaction passage 42. The second opposite passage 41 is formed on an opposite surface of the fuel distributing plate 4E which is opposite to an reaction surface 1d at side of an anode of a MEA 1. The second reaction passage 42 is formed on a facing surface which faces to the reaction surface 1d of the MEA 1. The fuel distributing plate 4E is made not of a porous material, but of a dense material.

A second refrigerant distributing plate 6E is made porous and has a transmission property in the thickness direction thereof to construct a second humidifying element. As a result, a refrigerant (generally, water) flowing in the second refrigerant passage 60 of the second refrigerant distributing plate 6E is transmitted in a thickness direction thereof (shown by an arrow M2). Thus, gaseous fuel flowing in the second opposite passage 41 of the fuel distributing plate 4E is humidified.

Sixth Embodiment

Next, a sixth embodiment of the present invention will be explained with reference to the above FIG. 1. The sixth embodiment has a construction basically same as that of the first embodiment, and performs the operation and gives the advantage basically same as that of the first embodiment.

In the sixth embodiment, an oxidant distributing plate 3F constructing a first humidifying element is comprised of a base member made of a porous material having a hydrophilic property. As a result, a water as a liquid phase stayed in a first reaction passage 32 of the oxidant distributing plate 3F is transmitted in a thickness direction (as shown by an arrow X1) by a capillarity etc. That is, the transmitted water is transferred to a first opposite passage 31 of the oxidant distributing plate 3F, to effectively humidify the oxidant gas flowing in the first opposite passage 31. Here, the hydrophilic property of the oxidant distributing plate 3F is given by selecting a hydrophilic material, or by putting the oxidant distributing plate 3F under a hydrophilic treatment.

A fuel distributing plate 4F constructing a second humidifying element is comprised of a base member made of a porous material having a hydrophilic property. As a result, a water component created in the second reaction passage 42 of the fuel distributing plate 4F is transmitted in a thickness direction (as shown by an arrow X3) as a water of a liquid phase by a capillarity etc. That is, the transmitted water is transferred to the second opposite passage 41 of the fuel distributing plate 4F, to effectively humidify the fuel gas flowing in the second opposite passage 41. Here, the hydrophilic property of the fuel distributing plate 4F is given by selecting a hydrophilic material, or by putting the fuel distributing plate 4F under a hydrophilic treatment.

When the oxidant distributing plate 3F and/or the fuel distributing plate 4F have/has the hydrophilic property, a pore diameter thereof can be made substantially constant. On the facing surface of the hydrophilic oxidant distributing plate 3F facing to the MEA 1, the pore diameter of the first reaction passage 32 may gradually decrease from an upstream toward a downstream. The pore can have diameter ranging from 0.1 to 10 μm, for example. Small diameter can make a capillary pressure large, which is convenient for allowing the water to transmit the oxidant distributing plate 3F in the thickness direction thereof.

On the facing surface of the hydrophilic oxidant distribution plate 3F facing to the MEA 1, a pore rate of the first reaction passage 32 may gradually increase toward the downstream. The pore rate can range for example from 5 to 40% for example.

Such pore diameter and pore rate are convenient to heighten, in the downstream area of the first reaction passage 32, a water transmitting property shown by an arrow X1, and a gas transmitting property shown by an arrow X2. Here, the pore diameter and the pore rate of the fuel distribution plate 4F can be selected in the same manner as the oxidant distributing plate 3F.

Seventh Embodiment

Figure 6:
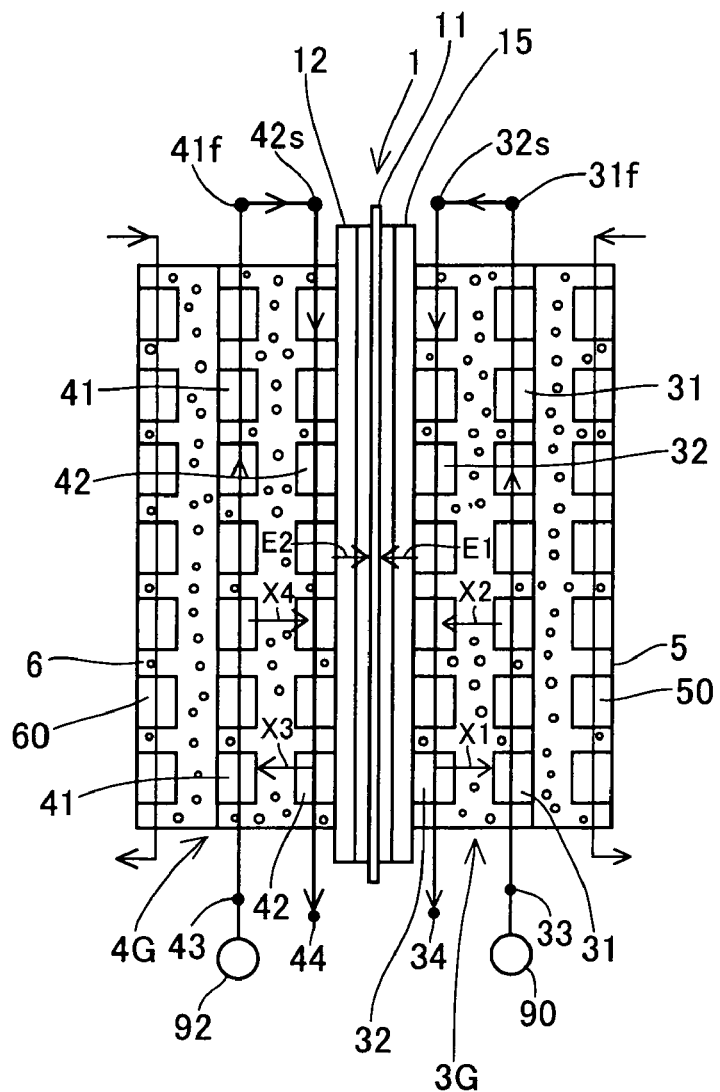
FIG. 6 relates to the seventh embodiment and is a cross-sectional view showing a concept of the fuel cell schematically.
Figure 7:
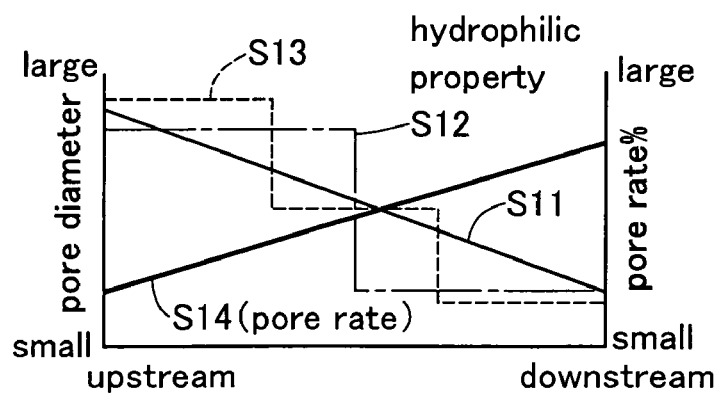
FIG. 7 relates to the seventh embodiment and shows a variation of the pore diameter from an upper end to a lower end in the oxidant distributing plate.

Next, a seventh embodiment of the present invention is shown in FIGS. 6 and 7. The seventh embodiment has a construction basically same as that of the first embodiment, and performs the operation and gives the advantage basically same as that of the first embodiment.

In the seventh embodiment, an oxidant distributing plate 3G constructing a first humidifying element is made of a porous material having a hydrophilic property to have a transmitting property in the thickness direction thereof. On a facing surface of the oxidant distributing plate 3G facing to a MEA 1, a pore diameter of a first reaction passage 32 is selected relatively small at a downstream, and relatively large at an upstream.

Here, as shown by a property line S11 in FIG. 7, the pore diameter of the first reaction passage 32 varies continuously to decrease from the upstream to the downstream. Alternately, as shown by property lines S12 and S13, the pore diameter of the first reaction passage 32 can vary stepwise to decrease from the upstream to the downstream. A pore rate can range from 5 to 40%, for example.

Small diameter of the pores can make the capillary pressure large, which is convenient for allowing the water to transmit to an inner portion in the thickness direction of the oxidant distributing plate 3G. For this reason, in the first reaction passage 32 of the oxidant distributing plate 3G, the capillary pressure of the pores is relatively higher at the downstream area where the pore diameter is relatively small, than at the upstream area where the pore diameter is relative large.

On the facing surface of the hydrophilic oxidant distribution plate 3G facing to the MEA 1, the pore rate of the first reaction passage 32 may gradually increase toward the downstream, as shown by a property line S14 in FIG. 7. The pore rate can range from 5 to 40%, for example.

The present embodiment is convenient to heighten, at the downstream area of the first reaction passage 32, a water transmitting property shown by an arrow X1, and a gas transmitting property shown by an arrow X2.

In the present embodiment, a created water stayed at the downstream area in the first reaction passage 32 of the oxidant distributing plate 3G, is transmitted in the thickness direction thereof (shown by an arrow X1), to be transferred to the first opposite passage 31. Thus, a dehumidifying function at the downstream area of the oxidant distributing plate 3G can be secured, which results in that a flooding phenomenon at the downstream area of the oxidant distributing plate 3G is restrained.

Also, a fuel distributing plate 4G constructing a second humidifying element has a hydrophilic property. On a facing surface facing to the MEA 1, a pore diameter of a first reaction passage 42 is selected relatively small at a downstream, and relatively large at an upstream.

Here, as shown by a property line S11 in FIG. 7, the pore diameter of the second reaction passage 42 varies continuously to decrease from the upstream toward the downstream. Alternately, as shown by property lines S12 and S13 is FIG. 7, the pore diameter of the second reaction passage 42 can vary stepwise to decrease from the upstream to the downstream.

For this reason, the capillary pressure of the pores in the second reaction passage 42 of the fuel distributing plate 4G is selected relatively large at the downstream area where the pore diameter is small. As a result, the water stayed in the downstream area of the second reaction passage 42 is transmitted through the fuel distributing plate 4G in the thickness direction thereof (as shown by the arrow X3) to the second opposite passage 41.

A pore rate of the fuel distributing plate 4G facing to the MEA 1 is varied as follows. As shown by the property line 14 in FIG. 7, the pore rate of the second reaction passage 42 gradually increases from the upstream toward the downstream. Here, the pore rate can range from 0.1 to 10 μm, for example.

Eighth Embodiment

Next, an eighth embodiment of the present invention will be explained with reference to the above FIG. 1. The eighth embodiment has a construction basically same as that of the first embodiment, and performs the operation and gives the advantage basically same as that of the first embodiment.

As shown in FIG. 1, an oxidant distributing plate 3H constructing a first humidifying element is comprised of a base member made of a porous material having a hydrophobic (water repellent) property, and has a transmitting property in the thickness direction thereof. A water component (vapor) stayed in a first reaction passage 32 of the oxidant distributing plate 3H is diffused in the thickness direction thereof, to be transferred to a first opposite passage 31 of the oxidant distributing plate 3H.

Thus, the oxidant gas flowing in the first opposite passage 31 of the oxidant distributing plate 3H is conveniently humidified by the vapor. Here, the hydrophobic property of the oxidant distributing plate 3H is given by selecting hydrophobic material, or by putting the oxidant distributing plate 3H under a hydrophobic treatment.

A fuel distributing plate 4H constructing a second humidifying element is comprised of a base member made of a porous material having a hydrophobic (water repellent) property. A water component (vapor) created in a second reaction passage 42 of the fuel distributing plate 4H is diffused through the pores in the thickness direction thereof (shown by the arrow X3) to be transferred to a second opposite passage 41 of the fuel distributing plate 4H. Thus, the gaseous fuel flowing in the second opposite passage 41 of the fuel distributing plate 4H is conveniently humidified by the vapor. Here, the hydrophobic property of the fuel distributing plate 4H is given by selecting hydrophobic material, or by putting the fuel distributing plate 4H under a hydrophobic treatment.

When the oxidant distributing plate 3H and the fuel distributing plate 4H have the hydrophobic property, the pore diameter can be selected substantially constant.

However, the respective pore diameters of the hydrophobic oxidant distributing plate 3H and the hydrophobic fuel distributing plate 4H, can increase toward the downstream of the first reaction passage 32, on the facing surface facing to the MEA 1. Also, the pore rate of the hydrophobic oxidant distributing plate 3H and the hydrophobic fuel distributing plate 4H can increase toward the downstream of the first reaction passage 32. Here, the pore diameter can range from 0.1 to 10 μm, for example, and the pore rate can range from 5 to 40%, for example.

Ninth Embodiment

Figure 8:
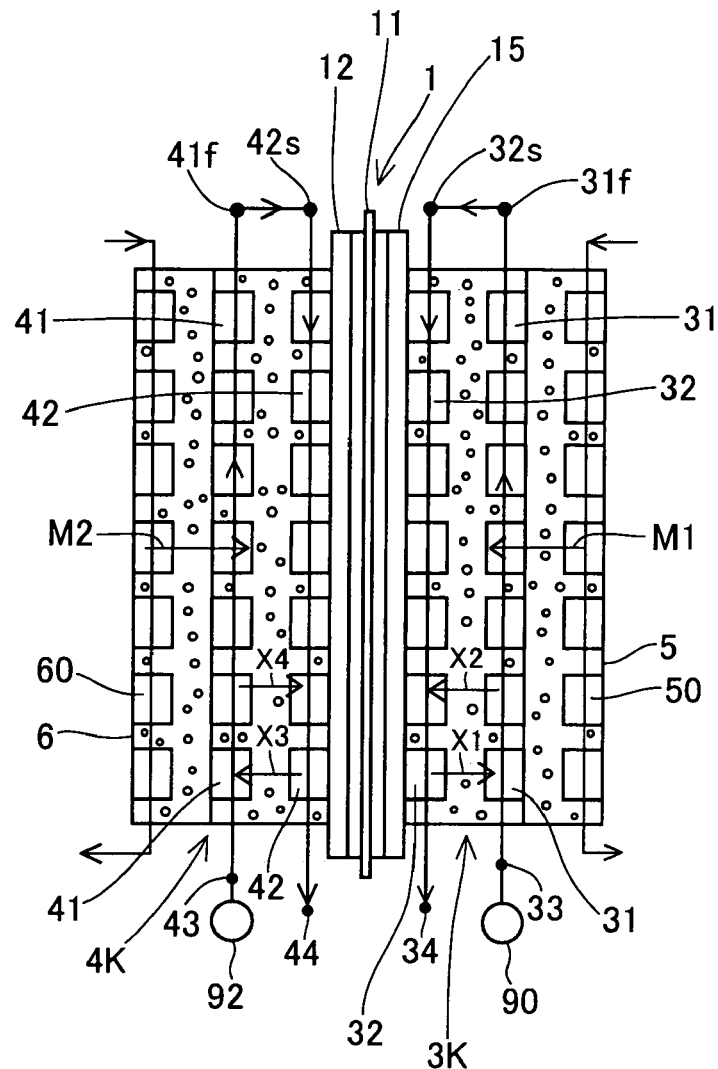
FIG. 8 relates to the ninth embodiment and is a cross-sectional view showing a concept of the fuel cell schematically.
Figure 9:
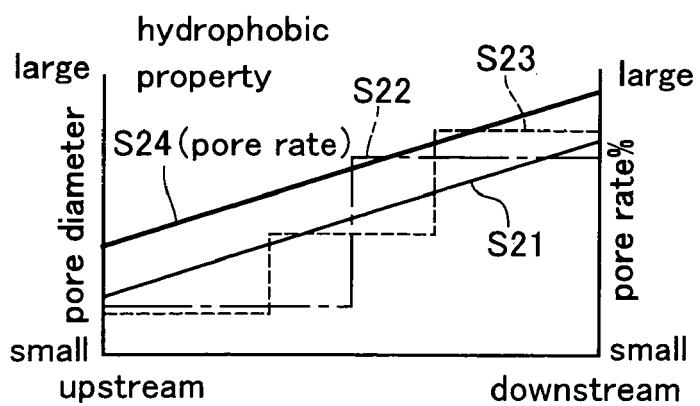
FIG. 9 relates to the ninth embodiment and shows a variation of the pore diameter from an upstream end to a downstream end of the oxidant distributing plate.

A ninth embodiment of the present invention is shown in FIGS. 8 and 9. The ninth embodiment has a construction basically same as that of the first embodiment, and performs the operation and gives the advantage basically same as that of the first embodiment.

In the present embodiment, an oxidant distributing plate 3K constructing a first humidifying element is comprised of a base member made of a porous material having a hydrophobic property. On a facing surface facing to a MEA 1, a pore diameter of a first reaction passage 32 of the oxidant distributing plate 3K is selected relatively large at a downstream, and relatively small at an upstream, respectively.

Here, as shown by a property line S21 in FIG. 9, the pore diameter of the first reaction passage 32 varies continuously to increase from the upstream to the downstream. Alternately, as shown by property lines S22 and S23 in FIG. 9, the pore diameter of the first reaction passage 32 can vary stepwise to increase from the upstream to the downstream. The pore diameter can range from 0.1 to 10 μm.

On the facing surface of the hydrophobic oxidant distribution plate 3K facing to the MEA 1, a pore rate of the first reaction passage 32 can gradually increase toward the downstream, as shown by a property line S24 in FIG. 9. The present embodiment is convenient to heighten, in the downstream area of the first reaction passage 32, a water transmitting property shown by an arrow X1, and a gas transmitting property shown by an arrow X2. The pore rate can range for example from 5 to 40%.

As apparent from a Kelvin's equation described as the following equation 1, in the hydrophobic distributing plate, when the pore diameter is large, the vapor pressure can be made small. As a result, the vapor easily condenses to become the water as the liquid phase. The oxidant distributing plate 3K is convenient to transfer the water as the liquid phase in the thickness direction (shown by the arrow X1) to the first opposite passage 31. Accordingly, the created water of the liquid phase stayed at the downstream area of the first reaction passage 32 of the oxidant distributing plate 3K is transmitted in the thickness direction (shown by the arrow X1), to be conveniently transferred to the first opposite passage 31. Thus, the flooding phenomenon at the downstream area of the oxidant distributing plate 3K is conveniently restrained. Here, a compulsory cooling by a first refrigerant distributing plate 5 and a second refrigerant distributing plate 6 contributes the vapor condensing.

The Kelvin's equation is basically used to determine the vapor partial pressure in the pore. Here, P is a balance pressure of the liquid in the pore, Po is a saturated vapor pressure of liquid in the predetermined temperature, σ is a surface tension of the liquid, M is a molecule mol mass of the liquid, θ is a contact angle of the liquid, ρ is a density of the liquid, R is a gas constant, and T is an absolute temperature. Generally, 0 to 90 degrees of the contact angle θ corresponds to the hydrophilic property, while 90 to 180 degrees corresponds to the hydrophobic property.

$$P = Po \cdot \exp[-\{(2\sigma M \cos \theta/(r\rho RT)\}] \qquad \text{equation 1}$$

According to the Kelvin's equation, when an inner wall surface of the pore is hydrophobic, value of the contact angle θ ranges from 90 to 180 degrees. As a result, cos θ has a negative value (cos θ<0) and the balance vapor pressure P becomes larger than the saturated vapor pressure Po (P>Po). Also, according to the Kelvin's equation, when an inner wall surface of the pore is hydrophobic, as the pore diameter r becomes larger, the vapor partial pressure P of the pores becomes smaller. As the pore diameter r becomes smaller, the vapor partial pressure P of the pores becomes larger.

Also, as shown in FIG. 8, a fuel distributing plate 4K constructing a second humidifying element is made of a porous material having a hydrophobic property. On a facing surface facing to the MEA 1, a pore diameter of the second reaction passage 42 can be selected relatively large at a downstream, and relatively small at an upstream.

Here, as shown by a property line S21 in FIG. 9, the pore diameter of the second reaction passage 42 varies continuously to increase from the upstream to the downstream. Alternately, as shown by property lines S22 and S23 in FIG. 9, the pore diameter of the second reaction passage 42 can vary stepwise to increase from the upstream to the downstream.

As a result, the water as the liquid phase stayed at the downstream area of the second reaction passage 42 of the fuel distributing plate 4K is transmitted in the thickness direction (shown by the arrow X3), to be transferred to the second opposite passage 41. Thus, the flooding phenomenon at the downstream area of the fuel distributing plate 4K can be restricted.

Here, noted that the oxidant distributing plate 3 and the fuel distributing plate 4 of the above mentioned second, third and fourth embodiment can have the hydrophobic property on occasion.

Tenth Embodiment

Figure 10:
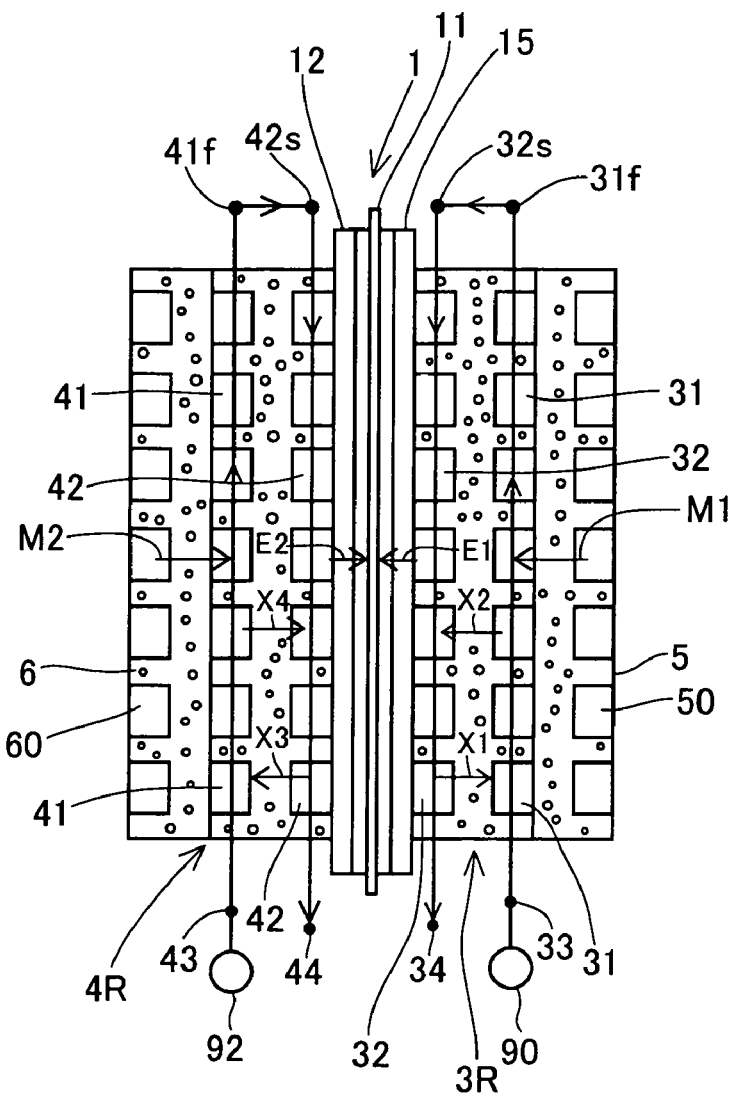
FIG. 10 relates to the tenth embodiment and is a cross-sectional view showing a concept of the fuel cell schematically.
Figure 11:
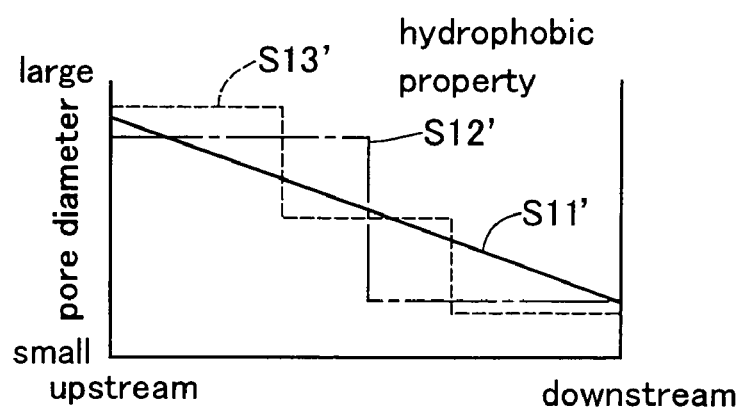
FIG. 11 relates to the tenth embodiment and shows a variation of the pore diameter from an upstream end to a downstream end of the oxidant distributing plate.

A tenth embodiment of the present invention is shown in FIGS. 10 and 11. The tenth embodiment has a construction basically same as that of the ninth embodiment shown in FIG. 8, and performs the operation and gives the advantage basically same as that of the ninth embodiment.

Both of an oxidant distributing plate 3R constructing a first humidifying element, and a fuel distributing plate 4R constructing a second humidifying element, are made of a porous base member having a hydrophobic (water repellent) property.

In the present embodiment, small-large relation of the pores is reversed to that of the ninth embodiment shown in FIG. 8. That is, as shown by property lines S11', S12' and S13', on a facing surface of the oxidant distributing plate 3R facing to the MEA 1, a pore diameter of the first reaction passage 32 is selected relatively small at the downstream area, and relatively large at the upstream area, respectively.

According to the above Kelvin's equation, the vapor partial pressure in the pores becomes larger when the pore diameter is small. Thus, the oxidant gas in the first opposite passage 31 of the oxidant distributing plate 3R can be humidified by diffused vapor. That is, the created water in the first reaction passage 32 vaporizes to diffuse as the vapor, resulting in humidifying the oxidant gas in the first opposite passage 31. The fuel in the fuel distributing plate 4R is humidified in the same manner.

Eleventh Embodiment

Figure 12:
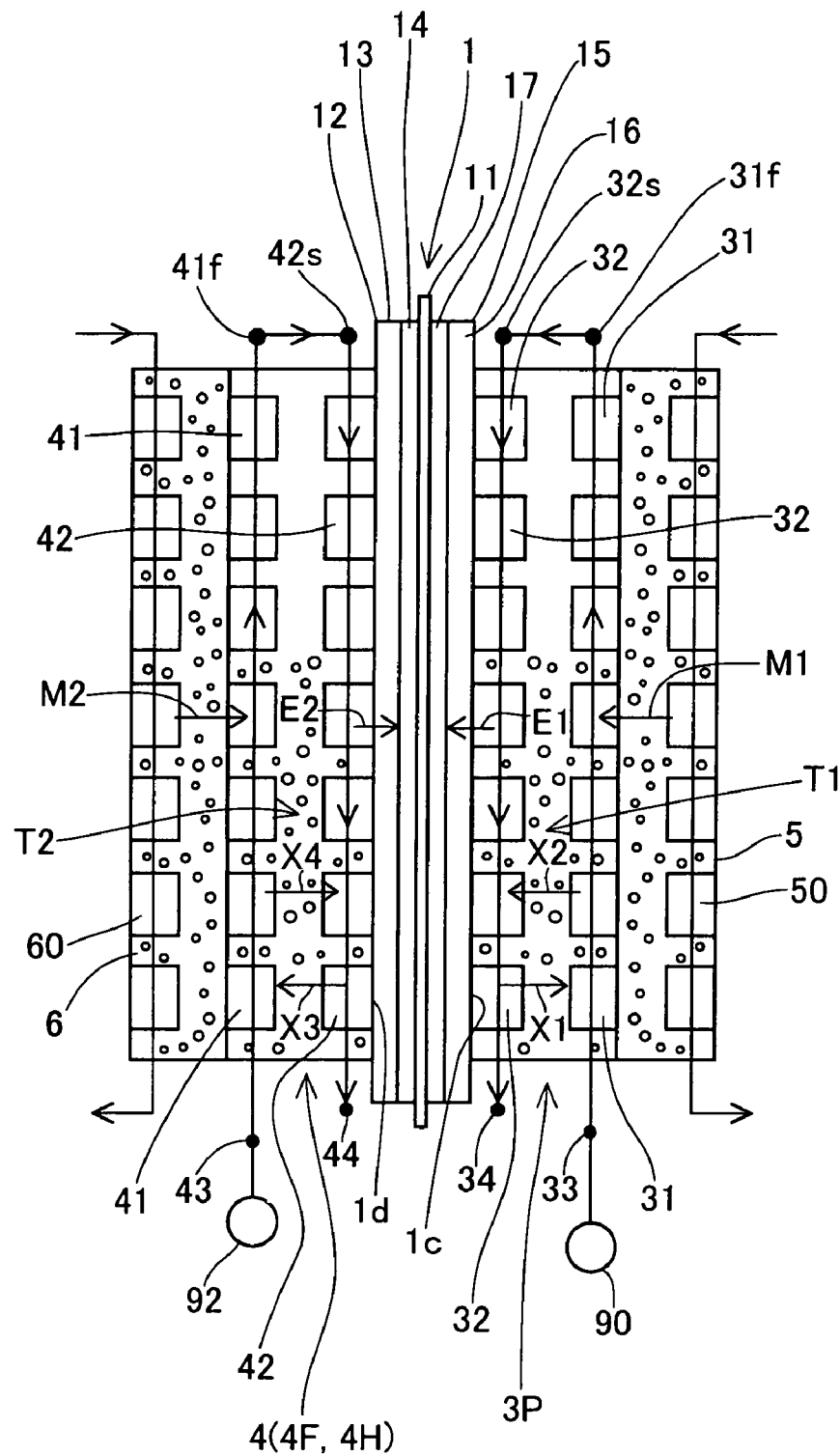
FIG. 12 relates to the eleventh embodiment and is a cross-sectional view showing a concept of the fuel cell schematically.

An eleventh embodiment of the present invention is shown in a FIG. 12. The eleventh embodiment has a construction basically same as that of the first embodiment, and performs the operation and gives the advantage basically same as that of the first embodiment. In an oxidant distributing plate 3P, a downstream area of a first reaction passage 32 is made porous, but an upstream area of the first reaction passage 32 is made dense. The dense property is convenient to increase strength, conductivity and a current collecting property of the densified portion. A fuel distributing plate 4P can be constructed in the same manner as the oxidant distributing plate 3P.

Manufacturing Sample

The above mentioned porous oxidant distributing plate 3 and the porous fuel distributing plate 4 can be manufactured by a following method. A carbon system material, a binder and a vanishable pore-forming material are mixed to prepare a mixed material. A natural graphite and an artificial graphite etc. are included in the carbon system material. A thermosetting resin such as a phenol resin is included in the binder. A cellulose system organic material is included in the pore-forming material.

The mixed material is pressed by a molding surface of a mold and formed into a formed body. The formed body is baked in a predetermined baking temperature (for example, 500 to 600° C.) to vanish the pore-forming material. Thus, the oxidant distributing plate 3 and the fuel distributing plate 4 each having the multiple pores can be formed.

Size of the pore-forming material is varied from the upstream area to the downstream area, to vary the pore diameter from the upstream area to the downstream area. Large-sized pore forming material makes the pore diameter large, while small-sized pore forming material makes the pore diameter small. As the pore diameter, 1 to 100 μm, 2 to 30 μm and 2 to 15 μm can be selected. Also, 3 to 4 μm can be selected.

As the pore rate, 10 to 90% and 15 to 60 by the volume ratio can be selected. Also, 20 to 40% by the volume ratio can be selected.

As the hydrophobic materials which give the hydrophobic property to the oxidant distributing plate 3, a fluorine atom, $CF_2$ group, $CF_3$ group, $CH_3$ group and $CH_2$ group can be given. Concretely, a fluorine, fluoroplastic (PTFE, FEP, PFA, PVDF etc.), graphite fluoride, hydrophobic carbon, silane compound and parffin etc. can be given. As a reform gas for the hydrophobic treatment, fluoride gas, or a gas which contains the fluoride gas and an inert gas (nitrogen etc.) as main components, can be given.

For the hydrophilic treatment, a solution in which a hydrophilic material is dissolved or dispersed in a liquid medium (water, alcohol etc.) can be used. Such solution is contacted with the oxidant distributing plate 3. As the hydrophilic material, a hydrogen peroxide water, powder of silicon dioxide and powder of aluminum oxide etc., can be given. Here, containing large amount of hydrophilic functional group such as hydroxy group and carboxyl group etc. on a surface thereof can be given.

Further, a starch-acrylylic acid copolymer, polyacrylic acid and polyvinyl alcohol etc. all of which are absorbent resin, can be used. Also, an ion-exchange resin and absorbent polysaccharide can be given as the hydrophilic material. The hydrophilic material has at least one kind of hydrophilic functional group selected from the hydroxy group, carboxyl group, aldehyde group, amino group and sulfo group, in a construction thereof.

Sample of Oxidant Distributing Plate 3

Next, the above-mentioned oxidant distributing plate 3 of the first embodiment is viewed from a humidifying aspect. As the oxidant gas before the reaction flows in the first opposite passage 31, a whole area or substantially whole area of the first opposite passage 31 is humidified. When the humidity of an upstream U1 (UP) where the first opposite passage 31 has not been sufficiently humidified is compared with the humidity of a downstream area D1 (DOWN) where the first opposite passage 31 has been sufficiently humidified, the humidify of the downstream area D1 is higher than that of the upstream area U1.

In the first reaction passage 32 of the oxidant distributing plate 3, it is preferable that the oxidant gas be humidified when it reach the upstream area U2 of the first reaction passage 32 via the first opposite passage 31. In view of the above circumstances, disposing the downstream area D1 of the first opposite passage 31 on the opposite surface and the upstream area U2 of the first reaction passage 32 on the facing surface, of the oxidant distributing plate 3 as close as possible is preferable. Such arrangement can heighten the humidity at the upstream area U2 of the first reaction passage 32, which can secure proper power generation from the start portion of the first reaction passage 32.

Figure 13:
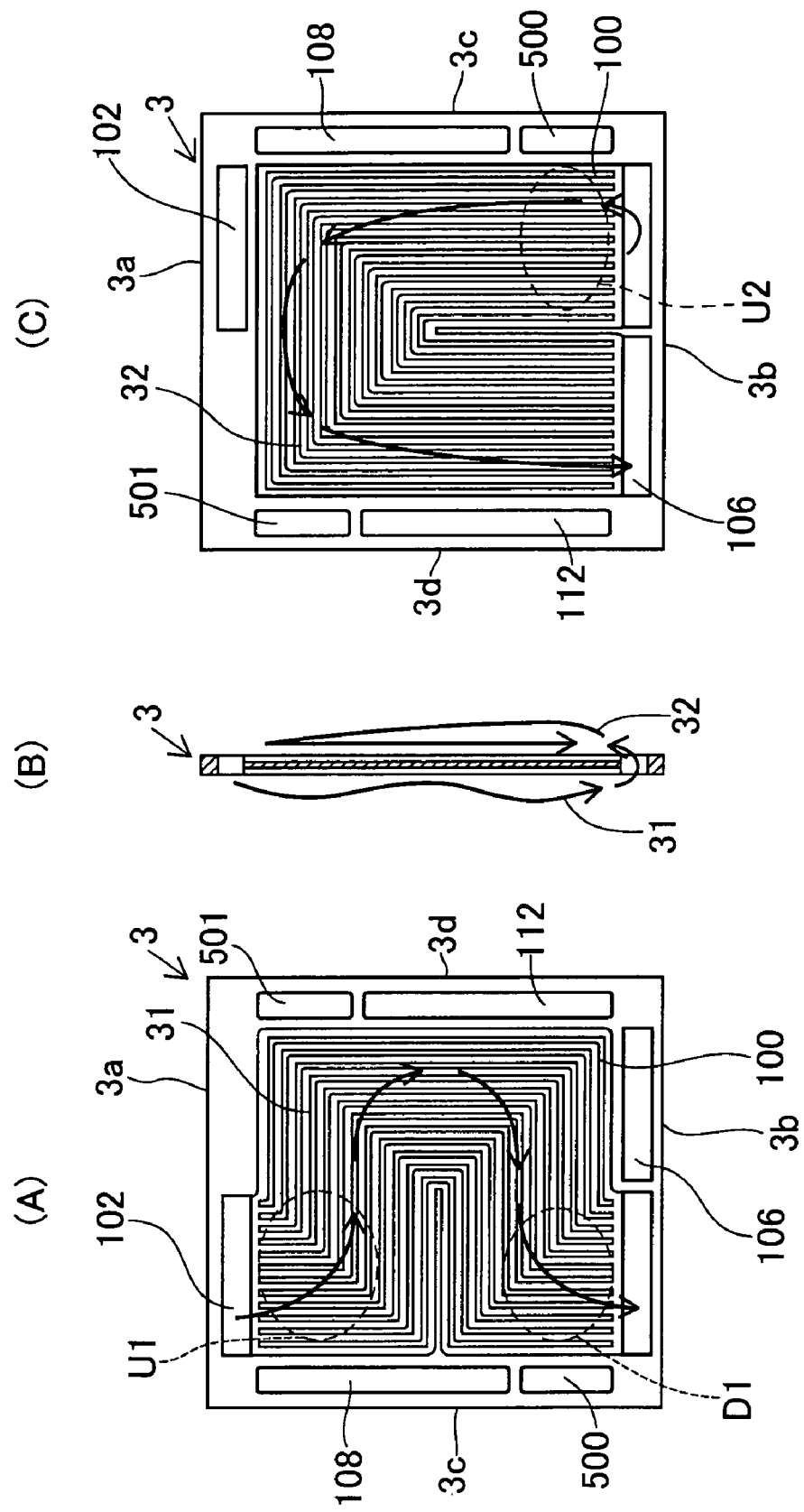
Figure 14:
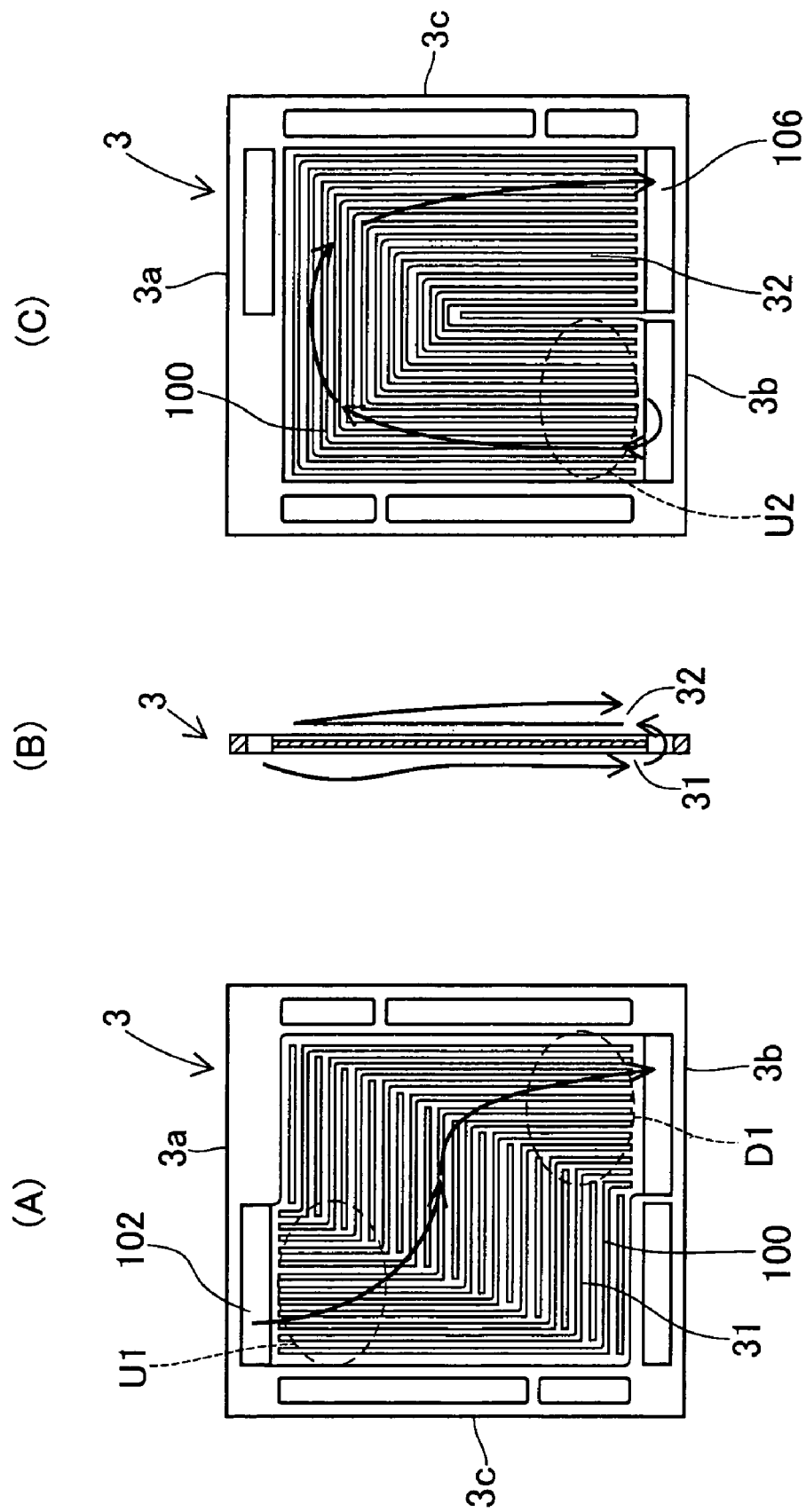
Figure 15:
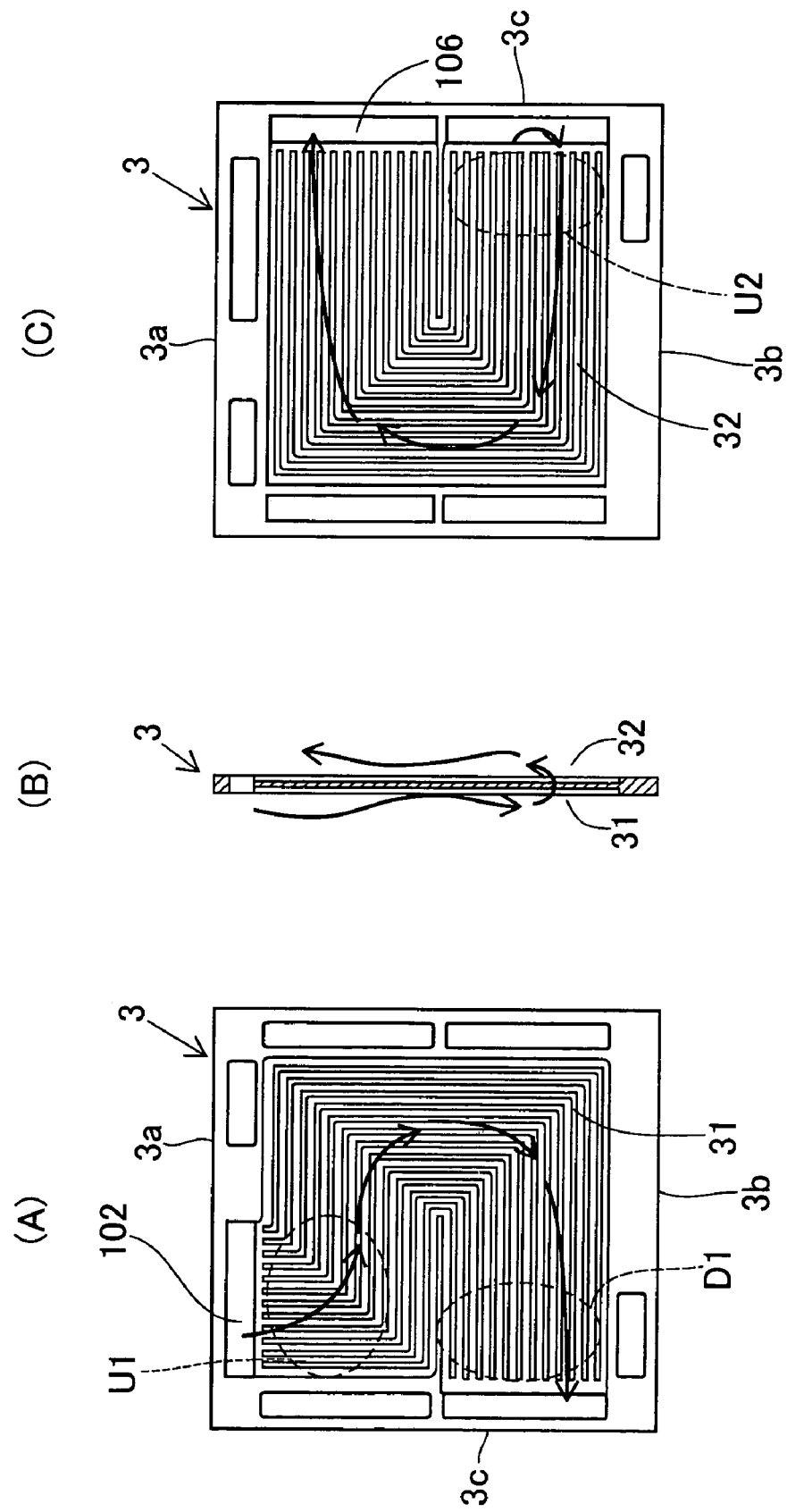

For the above purpose, various forms or modes of the oxidant distributing plates 3 shown in FIGS. 13 to 15 can be adopted. Respective oxidant distributing plates 3 shown in FIGS. 13 to 15 has side portions 3a, 3b, 3c and 3d. A first opposite passage 31 and a first reaction passage 32 are formed on the opposite surface and the facing surface of the oxidant distributing plate 3 respectively, by the front-rear relation. In each oxidant distributing plate 3, guide projections 100 for guiding the oxidant gas flowing in the first opposite passage 31 and the first reaction passage 32, are provided.

An air inlet manifold 102 for supplying a fresh air into the first opposite passage 31 of the oxidant distributing plate 3 is provided. An air outlet manifold 106 for discharging the air-off gas having flowed in the first reaction passage 32 and having been utilized for the power generation, is provided. A fuel inlet manifold 108 for supplying a fresh gaseous fuel into the second opposite passage 41 is provided. A fuel outlet manifold 112 for discharging the fuel-off gas having flowed in the second reaction passage 42 and having been utilized for the power generation, is provided.

A refrigerant inlet manifold 500 for supplying a refrigerant to the first refrigerant passage 50 and a second refrigerant passage 60 is provided. A refrigerant outlet manifold 501 for discharging the refrigerant discharged from the first refrigerant passage 50 and the second refrigerant passage 60 is provided.

In each of the modes shown in FIGS. 13 to 15, the downstream area D1 of the first opposite passage 31 where the humidification has progressed, and the upstream area U2 of the first reaction passage 32 are correlated by the front-rear relation, or substantially by the front-rear relation. That is, the downstream area D1 on the opposite surface, and the upstream area U2 on the facing surface are formed at the corresponding portion of the oxidant distributing plate 3. As a result, humidification of the oxidant gas before the reaction finishes when the oxidant gas reaches the upstream area U2 of the first reaction passage 32, by way of the first opposite passage 31.

Others

Noted that the present invention is by no means limited to the above mentioned embodiments. The present invention can be carried out by modifying the components without deviating the gist thereof. Following technical concepts or features described as the provisional claim can be included in the present invention.

provisional claim 1: A fuel distributing plate to be disposed facing to a fuel pole of a membrane-electrode assembly of a fuel cell for supplying a fuel to the fuel pole,
characterized by:
an opposite passage formed on an opposite surface which is opposite to the membrane-electrode assembly; and
a reaction passage which is formed on a facing surface which faces to the membrane-electrode assembly, which is communicated with the opposite surface, and which allows the fuel having flowed in the opposite passage to flow in the reaction passage.

provisional claim 2: A fuel distributing plate according to provisional claim 1, wherein-at least a downstream area of the reaction passage is made porous.

provisional claim 3: An oxidant distributing plate,
characterized by that:
a downstream area of a first opposite passage of the oxidant distributing plate, and an upstream area of a first reaction passage of the oxidant distributing plate are formed by a front-rear relation of the oxidant distributing plate.

provisional claim 4: An fuel distributing plate,
characterized by that:
a downstream area of a second opposite passage of the fuel distributing plate, and an upstream area of a second reaction passage of the fuel distributing plate are formed by a front-rear relation of the oxidant distributing plate.

provisional claim 5: An oxidant distributing plate to be disposed facing to an oxidant pole of a membrane-electrode assembly of a fuel cell for supplying an oxidant gas to the oxidant pole,
characterized by:
an opposite passage which is formed on an opposite surface opposite to the membrane-electrode assembly and in which the oxidant gas flows; and
a reaction passage which is formed on a facing surface which faces to the membrane-electrode assembly, which is communicated with the opposite passage, and which allows the oxidant gas having flowed in the opposite passage to flow in the reaction passage,
wherein on the facing surface, an average pore diameter is different between an upstream and a downstream, of the flowing oxidant gas.

provisional claim 6: A fuel cell, comprising:
a membrane-electrode assembly including an electrolyte membrane having an ion-conducting property, an oxidant pole disposed at one side of the electrolyte-membrane assembly in a thickness direction thereof, and a fuel pole disposed at other side of the electrolyte-membrane assembly in the thickness direction thereof;
an oxidant distributing plate disposed facing to the oxidant pole for supplying an oxidant gas to the oxidant pole; and
a fuel distributing plate disposed facing to the fuel pole for supplying a fuel to the fuel pole,
characterized by that:
at least one of the oxidant distributing plate and the fuel distributing plate is provided with (a) an opposite passage formed on an opposite surface which is opposite to the membrane-electrode assembly, (b) a reaction passage which is formed on a facing surface which faces to the membrane-electrode assembly, which is communicated with the opposite passage, and which allows an oxidant gas or a fuel having flowed in the opposite passage to flow in the reaction passage, and (c) a porous portion communicating at least a part of the opposite passage with at least a part of the reaction passage,
wherein an active material contained in the oxidant gas or an active material contained in a fuel flowing in the opposite passage is supplied to the reaction passage through pores of the porous portion.

In this fuel cell, the active material contained in the fresh oxidant gas or the active material contained in the fresh fuel flowing in the opposite passage is transmitted in a thickness direction of the oxidant distributing plate, to be supplied to the reaction passage through pores of the porous portion.

provisional claim 7: A fuel cell according to the provisional claim 6, wherein the porous portion is provided at least at a downstream area of the reaction passage.

provisional claim 8: An oxidant distributing plate to be disposed facing to an oxidant pole of a membrane-electrode assembly of a fuel cell for supplying an oxidant to the oxidant pole,
characterized by:
(a) an opposite passage formed on an opposite surface which is opposite to the membrane-electrode assembly, (b) a reaction passage which is formed on a facing surface which faces to the membrane-electrode assembly, which is communicated with the opposite surface, and which allows the oxidant having flowed in the opposite passage to flow in the reaction passage, and (c) a porous portion communicating at least a part of the opposite passage with at least a part of the reaction passage,
wherein an active material contained in the oxidant gas flowing in the opposite passage is supplied to the reaction passage via pores of the porous portion.

provisional claim 9: A fuel distributing plate to be disposed facing to a fuel pole of a membrane-electrode assembly of a fuel cell for supplying a fuel to the fuel pole,
characterized by:

(a) an opposite passage formed on an opposite surface which is opposite to the membrane-electrode assembly, and (b) a reaction passage which is formed on a facing surface which faces to the membrane-electrode assembly, which is communicated with the opposite surface, and which allows the fuel having flowed in the opposite passage to flow in the reaction passage, and (c) a porous portion communicating at least a part of the opposite passage with at least a part of the reaction passage, wherein an active material contained in the fuel flowing in the opposite passage is supplied to the reaction passage via pores of the porous portion.

INDUSTRIALLY APPLICABLE FIELD

The fuel cell of the present invention can be mounted on a vehicle, can be set in the predetermined position, or can be portable. The fuel cell can be used personally or in business.

The invention claimed is:

1. A fuel cell, comprising:
   a membrane-electrode assembly including an electrolyte membrane having an ion-conducting property, an oxidant pole disposed at one side of the electrolyte membrane in a thickness direction thereof, and a fuel pole disposed at other side of the electrolyte membrane in the thickness direction thereof;
   an oxidant distributing plate disposed facing the oxidant pole that supplies an oxidant gas to the oxidant pole; and
   a fuel distributing plate disposed facing the fuel pole that supplies a fuel to the fuel pole, wherein
   at least one of the oxidant distributing plate and the fuel distributing plate is provided with (a) an opposite passage formed on an opposite surface which is opposite to the membrane-electrode assembly, and (b) a reaction passage on a facing surface which faces the membrane-electrode assembly, which is communicated with the opposite passage, and which allows the oxidant gas or the fuel having flowed in the opposite passage to flow in the reaction passage, and
   wherein a pore rate of the oxidant distributing plate is larger at a downstream area than at an upstream area of the reaction passage.

2. The fuel cell according to claim 1, wherein for at least one of the oxidant distributing plate and the fuel distributing plate, a humidifying element that humidifies the oxidant gas or the fuel flowing in the opposite passage in the fuel cell is provided.

3. The fuel cell according to claim 2, wherein the humidifying element includes a part of the fuel distributing plate that is porous and has a transmitting property in a thickness direction thereof.

4. The fuel cell according to claim 1, further including a refrigerant distributing plate disposed at opposite side which is opposite to the membrane-electrode assembly with respect to the oxidant distributing plate and/or the fuel distributing plate for allowing a refrigerant to flow, wherein a humidifying element is formed by making the refrigerant distributing plate porous to have a transmitting property in a thickness direction thereof, so that the refrigerant flowing in the refrigerant distributing plate is supplied to the opposite passage of the oxidant distributing plate and/or the fuel distributing plate.

5. The fuel cell according to claim 1, wherein a downstream area of the opposite passage and an upstream area of the reaction passage of the oxidant distributing plate, are formed on the oxidant distributing plate by a front-rear relation.

6. The fuel cell according to claim 1, wherein the oxidant distributing plate and/or the fuel distributing plate have/has a hydrophilic property.

7. A fuel cell, comprising:
   a membrane-electrode assembly including an electrolyte membrane having an ion-conducting property, an oxidant pole disposed at one side of the electrolyte membrane in a thickness direction thereof, and a fuel pole disposed at other side of the electrolyte membrane in the thickness direction thereof;
   an oxidant distributing plate disposed facing the oxidant pole that supplies an oxidant gas to the oxidant pole; and
   a fuel distributing plate disposed facing the fuel pole that supplies a fuel to the fuel pole, wherein
   at least one of the oxidant distributing plate and the fuel distributing plate is provided with (a) an opposite passage formed on an opposite surface which is opposite to the membrane-electrode assembly, (b) a reaction passage which is formed on a facing surface which faces the membrane-electrode assembly, which is communicated with the opposite passage, and which allows the oxidant gas or the fuel having flowed in the opposite passage to flow in the reaction passage, and (c) a porous portion that communicates at least a part of the opposite passage with at least a part of the reaction passage, wherein an active material contained in the oxidant gas or an active material contained in the fuel flowing in the opposite passage is supplied to the reaction passage via pores of the porous portion, and
   wherein a pore rate of the at least one of the oxidant distributing plate and fuel distributing plate is larger at a downstream area than at an upstream area, of the reaction passage.

8. The fuel cell according to claim 7, wherein the part of the oxidant distributing plate and/or the part of the fuel distributing plate are/is a downstream area of the reaction passage.

9. An oxidant distributing plate for a fuel cell to be disposed facing to an oxidant pole of a membrane-electrode assembly of the fuel cell for supplying an oxidant gas to the oxidant pole, wherein
   an opposite passage which is formed on an opposite surface opposite to the membrane-electrode assembly and in which the oxidant gas flows; and
   a reaction passage which is formed on a facing surface which faces to the membrane-electrode assembly, which is communicated with the opposite passage, and which allows the oxidant gas having flowed in the opposite passage to flow in the reaction passage,
   wherein at least a downstream area of the reaction passage of the oxidant distributing plate is porous, and wherein a pore rate of the oxidant distributing plate is relatively larger at a downstream area than at an upstream area of the reaction passage.

10. The oxidant distributing plate for a fuel cell according to claim 9 wherein the oxidant distributing plate has a hydrophilic property.

* * * * *